United States Patent [19]

Jacoby et al.

[11] Patent Number: 5,317,035
[45] Date of Patent: May 31, 1994

[54] ORIENTED POLYMERIC MICROPOROUS FILMS

[75] Inventors: Philip Jacoby, Naperville; Charles W. Bauer, Batavia; Scott R. Clingman, Glen Ellyn, all of Ill.; William T. Tapp, Marietta, Ga.

[73] Assignee: Amoco Corporation, Chicago, Ill.

[21] Appl. No.: 993,300

[22] Filed: Dec. 18, 1992

Related U.S. Application Data

[60] Division of Ser. No. 749,213, Aug. 23, 1991, Pat. No. 5,176,953, which is a continuation-in-part of Ser. No. 633,087, Dec. 21, 1990, abandoned.

[51] Int. Cl.$^5$ ............................................. C08F 110/00
[52] U.S. Cl. ...................................... 521/143; 525/95; 525/191; 524/427
[58] Field of Search .................. 521/143; 525/95, 191; 524/427

[56] References Cited

U.S. PATENT DOCUMENTS

| | | | |
|---|---|---|---|
| 3,376,238 | 2/1968 | Gregorian et al. | 260/2.5 |
| 3,407,253 | 10/1968 | Yoshimura et al. | 265/289 |
| 3,426,754 | 2/1969 | Bierenbaum et al. | 128/156 |
| 3,539,374 | 11/1970 | Isaacson et al. | 117/7 |
| 3,551,363 | 12/1970 | Brody | 260/2.5 |
| 3,558,374 | 1/1971 | Boss et al. | 148/174 |
| 3,607,793 | 9/1971 | Mahlman | 260/2.5 M |
| 3,690,977 | 9/1972 | Loft et al. | 156/167 |
| 3,725,520 | 4/1973 | Suzuki et al. | 264/41 |
| 3,801,404 | 4/1974 | Druin et al. | 156/229 |
| 3,839,240 | 10/1974 | Zimmerman | 260/2.5 HA |
| 3,839,516 | 10/1974 | Williams et al. | 264/41 |
| 3,843,761 | 10/1974 | Bierenbaum et al. | 264/210 R |
| 3,844,865 | 10/1974 | Elton et al. | 156/229 |
| 3,920,785 | 11/1975 | Druin et al. | 264/210 R |
| 3,956,020 | 5/1976 | Weininger et al. | 136/146 |
| 3,969,562 | 7/1976 | Suzuki | 428/155 |
| 4,076,656 | 2/1978 | White et al. | 260/2.5 M |
| 4,100,238 | 7/1978 | Shinomura | 264/49 |
| 4,105,737 | 8/1978 | Suzuki | 264/154 |
| 4,116,892 | 9/1978 | Schwarz | 521/62 |

(List continued on next page.)

FOREIGN PATENT DOCUMENTS

| | | |
|---|---|---|
| 0256192 | 2/1988 | European Pat. Off. . |
| 0258002 | 3/1988 | European Pat. Off. . |
| 0273582 | 7/1988 | European Pat. Off. . |
| 199742 | of 0000 | Japan . |
| 9011321 | 10/1990 | PCT Int'l Appl. . |

OTHER PUBLICATIONS

JP-A-62195030.
JP-A-58049730.
JP-A-02292039.
H. J. Leugering, "Effect of Crystal Structure and Overstructure on Some Properties of Polypropylene", Makromol. Chem. 109, pp. 204–216, (1976).
Influencing of the crystal structure of isotactic polypropylene by crystallization from oriented melts, H. J. Leugering et al. (Die Angew, Makro Chem. 33,17 (1973).
Shear-induced B-Form Crystallization in Isotatic Polypropylene, H. Dragaun et al. (J. Polym. Sci., 15, 1779 (1977).
Studies on the a and B forms of Isotactic Polypropylene (List continued on next page.)

Primary Examiner—George F. Lesmes
Assistant Examiner—Chris Raimund
Attorney, Agent, or Firm—Nicholas A. Poulos; Stephen L. Hensley

[57] ABSTRACT

Polyolefin resin compositions and oriented microporous films prepared from same comprising an ethylene-propylene block copolymer having an ethylene content of about 10 to about 50 wt %, a propylene homopolymer or random propylene copolymer having up to about 10 wt % of a comonomer of ethylene or an α-olefin of 4 to 8 carbon atoms, a low molecular weight polypropylene, a beta-spherulite nucleating agent and an inorganic filler. The microporous films have improved breathability, strength, toughness and break elongation.

7 Claims, 1 Drawing Sheet

U.S. PATENT DOCUMENTS

| | | | |
|---|---|---|---|
| 4,138,459 | 2/1979 | Brazinsky et al. | 264/254 |
| 4,153,751 | 5/1979 | Schwarz | 428/304 |
| 4,185,148 | 1/1980 | Sato et al. | 526/348 |
| 4,197,148 | 4/1980 | Shinomura | 156/79 |
| 4,210,709 | 7/1980 | Doi et al. | 429/250 |
| 4,289,832 | 9/1981 | Schwarz | 428/542 |
| 4,331,622 | 5/1982 | Doi et al. | 264/45.3 |
| 4,335,193 | 6/1982 | Doi et al. | 429/251 |
| 4,343,853 | 8/1982 | Morrison | 428/233 |
| 4,386,129 | 5/1983 | Jacoby | 428/215 |
| 4,613,643 | 9/1986 | Nakamura et al. | 524/426 |
| 4,672,091 | 6/1987 | Berta | 525/88 |
| 4,705,813 | 11/1987 | Ito et al. | 521/92 |
| 4,777,073 | 10/1988 | Sheth | 428/155 |
| 4,791,144 | 12/1988 | Nagou et al. | 521/90 |
| 4,794,128 | 12/1988 | Kawaguchi et al. | 521/138 |
| 4,814,124 | 3/1989 | Aoyama et al. | 264/41 |
| 4,824,718 | 4/1989 | Hwang | 428/284 |
| 4,829,096 | 5/1989 | Kitamura et al. | 521/79 |
| 4,833,172 | 5/1989 | Schwartz et al. | 521/62 |
| 4,902,553 | 2/1990 | Hwang | 428/156 |
| 4,921,653 | 5/1990 | Aoyama et al. | 264/41 |
| 4,929,303 | 5/1990 | Sheth | 156/209 |
| 4,975,469 | 12/1990 | Jacoby et al. | 521/84.1 |
| 5,008,296 | 4/1991 | Antoon, Jr. et al. | 521/91 |
| 5,045,589 | 9/1991 | Ueno | 524/505 |
| 5,073,316 | 12/1991 | Bizen et al. | 264/22 |

OTHER PUBLICATIONS by Crystallization in a Temperature Gradient, A. J. Lovinger et al. (J. Polym. Sci. 15, 641 (1977)) H. J. Leugering (Makromol. Chem. 109, 204 (1967)).

A Thermal Study of B-Form Polypropylene, A. Duswalt et al. (Amer. Chem. Soc. Div. Org. Coat., 30, No. 2, 93 (1970)).

Kirk–Othmer Encyclopedia of Chemical Technology, Third Edition, vol. 10, pp. 232–245.

Crystalline Forms of Isotactic Polypropylene, A. Turner Jones et al. (Markromol Chem., 75, 134–158 (1964)).

ORIENTED POLYMERIC MICROPOROUS FILMS

CROSS-REFERENCE TO RELATED APPLICATION

This application is a divisional application of U.S. Ser. No. 749,213 filed Aug. 23, 1991 (now U.S. Pat. No. 5,176,953), which is in turn is a continuation-in-part application of U.S. Ser. No. 633,087 filed Dec. 21, 1990, now abandoned.

FIELD OF THE INVENTION

This invention relates to polymeric compositions capable of being converted into an oriented microporous films having microvoid cells and interconnecting pores between the cells, comprising an ethylene-propylene block copolymer having an ethylene content of about 10 to about 50 wt %, a propylene homopolymer or propylene copolymer having up to about 10 wt % of a comonomer of ethylene or an α-olefin of 4 to 8 carbon atoms and one or more components selected from low molecular weight polypropylene, a betaspherulite nucleating agent and calcium carbonate, and to processes for forming such microporous films wherein the films have improved breathability, strength, toughness and break elongation.

BACKGROUND OF THE INVENTION

Microporous polymeric films having structures that enable vapors to flow through them such that they are breathable or have breathability while at the same time inhibiting or stopping the flow of liquids through them have been known for some time. These types of films have been utilized in a wide variety of applications, such as in the preparation of synthetic leather, in the preparation of cloth laminates for use as synthetic shoes, raincoats, outer wear, camping equipment such as tents, and the like, and in combination with fabrics and other materials for preparation of medical applications such as surgical gowns, bandages, and the like, and applications such as house wrap, covers for automobiles and other motorized vehicles, and the like.

A variety of porous stretched polymeric films are known in the art. In general, there are three types of processes used to produce porous, melt-processed polymeric films including a stretching step. These three types are processes for stretching films of neat, unblended polymers containing no fillers, other than typical stabilizing additives; processes for making films from blends of two or more polymers, or from blends of polymer with mineral oil or an organic salt in which the dispersed phase is extracted with the film stretched before or after the extraction; and processes for producing films for blends of polymer with a filler such as calcium carbonate or barium sulfate with the film stretched after casting and without extraction.

Commonly assigned U.S. Pat. No. 4,975,469 discloses oriented porous polymeric films formed from a polypropylene-based resin and having a moisture vapor transmission rate (MVTR) determined according to ASTM E-96, procedure E, in the range of about 2,500 to about 7,500 g/m²/24 hr, and a process for forming the films. The aesthetic characteristics of these polypropylene porous films have a somewhat stiffer nature or harsher hand relative to porous film made from synthetic materials other than polypropylene and that they have a tendency to produce a "rustling" noise when flexed.

Commonly assigned U.S. Pat. No. 4,386,129 discloses a porous polymeric film having pores with polygonal cross sections and an average pore diameter of about 3 to about 100 microns formed from a resinous polymer of propylene and a process for forming the film comprising the steps of forming a film containing beta-spherulites and selectively extracting the beta-spherulites. Such films have utility as filtration devices, raincoats and tents.

Japanese Patent No. 199742 (1988) discloses a method for manufacturing a microporous polypropylene film from a composition consisting of polypropylene, a polymer with a melt crystallization point above that of polypropylene, and a beta-crystalline nucleating agent which is melt-extruded and molded into a sheet at 90° to 120° C., in which the resulting sheet is stretched at least uniaxially with an area draw ratio of 2.25–48.

EP 0 273 582A discloses a process wherein polypropylene blended with mineral oil and a nucleating agent is cast into a film. The mineral oil phase separates as droplets within the polypropylene matrix, and the droplets are removed in an extraction bath. The nucleating agent is said to act to reduce the size of the droplets and thereby reduce the size of the holes in the final product. The patent also discloses that the extracted film may be biaxially stretched although no description is given regarding the moisture vapor transmission rate of the resulting material.

U.S. Pat. No. 3,844,865 discloses a process in which polymeric materials of stretch-orientable, non-elastomeric, at least partially crystalline polymers derived from polymerization of one or more unsaturated monomers and stretch orientable polyurethanes and an inorganic salt such as calcium carbonate are formed into films and then stretched uniaxially or biaxially to obtain high moisture vapor transmission rates.

U.S. Pat. No. 4,350,655 discloses a process for forming porous thermoplastic films by cold stretching at high stretch tension and low stretch ratios films formed from a blend of synthetic orientable thermoplastic polymer and at least 50 wt % of an inorganic filler such as calcium carbonate, clays and titanium oxide coated with a fatty acid ester of silicon or titanium.

U.S. Pat. No. 4,185,148 discloses a process for producing a polypropylene film having a surface layer of beta-form crystals wherein the film is extruded with a thermal gradient such that one side of the film cools at a much more rapid rate than the other, thereby producing beta-crystals on the cooled side. The resulting film is biaxially stretched to produce a film having a rough surface and which is air-tight.

U.S. Pat. Nos. 4,210,709, 4,331,622 and 4,335,193 disclose microporous films produced by extracting an organic substance from a film comprising 40 to 90 volume percent of a polyolefin having a number average molecular weight of 15,000 or more, 10 to 60 volume percent of an inorganic filler and 2 to 20 wt % based on the total weight of polyolefin and inorganic filler of an organic substance which is substantially insoluble in and inert to sulfuric acid and has a solubility parameter ranging from 7.3 to 8.4. Disclosed inorganic fillers are silica, calcium silicate, aluminum silicate, aluminum oxide, calcium carbonate, magnesium carbonate, kaolin clay, pulverized talc, titanium oxide and diatomaceous earth. The organic substance includes low molecular weight polyolefins such as polyethylene wax, polyisobutylene, polybutadiene, and atactic polypropylene.

U.S. Pat. No. 4,791,144 discloses a microporous polypropylene film prepared by melt-forming into a film a mixture comprising (a) 20 to 80 wt % of a propylene homopolymer, a copolymer of propylene with other copolymerizable monomer or a blend thereof; (b) 80 to 20 wt % of at least one siliceous filler; (c) 10 to 40 wt % of a polyester type plasticizer and/or an epoxy-type plasticizer; and (d) a silane-type dispersant in an amount of 0.01 to 5 wt % based on the total weight of components (a), (b) and (c), and stretching the sheet or film at an area stretching ratio of 1.5 to 30.

U.S. Pat. Nos. 4,777,073 and 4,929,303 disclose a breathable polyolefin film and method for preparing same from melt embossed polyolefin/filler precursor films.

U.S. Pat. Nos. 4,814,124 and 4,921,653 disclose gas-permeable films prepared by stretching a film from a mixture containing a polyolefin resin such as polypropylene, low-density polyethylene, linear low-density polyethylene, high-density polyethylene, and polybutylene, copolymers such as ethylene-propylene copolymer and ethylene-vinyl acetate copolymer or blends of these polymers, and an inorganic filler such as calcium carbonate and barium sulfate preferably added at 50 to 500 parts by weight based on 100 parts by weight of the polyolefin resin.

U.S. Pat. Nos. 4,824,718 and 4,902,553 disclose a method of making microporous film comprising forming a blend of a crystallizable thermoplastic polymer such as polypropylene, polyethylene and polyethylene-polypropylene, a rattle-reducing additive material and a nucleating agent system such as a solid organic acid and an inorganic compound, extruding the blend into a film and orienting the film by stretching at a temperature in the range from 10° C. to a temperature 10° C. below the melting temperature of the thermoplastic polymer.

U.S. Pat. No. 4,613,643 discloses a process for forming soft porous sheets comprising 40 to 80 wt % of an inorganic filler and 60 to 20 wt % of a polyolefin-type thermoplastic elastomer composition such as ethylene-propylene copolymer, ethylene-propylene-diene copolymer, ethylene-butene copolymer and propylene-butene copolymer, and stretching the sheet at a temperature lower than the softening temperature of the polyolefin type thermoplastic elastomer.

U.S. Pat. No. 4,833,172 discloses a method for producing microporous material comprising a matrix consisting essentially of linear ultra-high molecular weight polyolefin, a large proportion of finely divided water-soluble siliceous filler and interconnecting pores by stretching to increase the porosity and provide a region of stretch-induced molecularly oriented polymer in the matrix.

U.S. Pat. No. 5,008,296 discloses microporous films prepared by stretching a film cast from composition of a polyolefin and high levels of $CaCO_3$ or glass beads and calcium stearate in two directions from 1.5 to 7 times in each direction and having Gurley porosities of from 0.1 to 85 seconds.

Despite the porous films and methods of preparing same disclosed in the patents above, there remains a need for polymeric compositions capable of being formed into microporous films with improved strength and breathability and for a facile processes for forming such microporous films. It is an object of this invention to provide improved polymeric compositions capable of being converted into oriented microporous polymeric films. Another object of this invention is to provide oriented microporous polymeric film and improved processes for preparing these films. Other objects of this invention will be apparent to persons skilled in the art from the following description and claims.

We have found that the objects of this invention can be attained by providing a polymeric composition comprising ethylene-propylene block copolymer, polypropylene homopolymer or random copolymer of polypropylene having up to 10 wt % of a comonomer such as ethylene or an α-olefin of 4 to 8 carbon atoms and one or more components selected from low molecular weight polypropylene, beta-spherulite nucleating agent and inorganic filler such as calcium carbonate from which oriented polymeric microporous films are produced which have a MVTR of about 500 $g/m^2/24$ hr or greater as determined according to ASTM E-96, procedure E. Compositions comprising about 5 to about 30 wt % of the ethylene-propylene block copolymer, about 70 to about 95 wt % of the polypropylene homopolymer or random copolymer and beta-spherulite nucleating agent are converted into oriented polymeric microporous films by a process including the extractive removal of beta-spherulites. Polymeric compositions comprising ethylene-propylene block copolymer and polypropylene homopolymer or random copolymer in a weight of about 30-95/70-5 and one or more components elected from low molecular weight polypropylene, beta-spherulite nucleating agent and calcium carbonate are converted into oriented polymeric microporous films by orienting films cast from the compositions without any extraction step.

Advantageously, we have found that the polymeric compositions of this invention provide oriented microporous films that exhibit improved breathability, strength, toughness and break elongation and are useful for apparel applications such as sportswear, ski clothing, lining material for sportswear and the like, medical apparel such as surgical drapes, protective gowns and the like, equipment covers, filters, housewrap, pressure sensitive labels and the like.

SUMMARY OF THE INVENTION

Briefly, the polymeric composition capable of being converted into an oriented polymeric microporous film according to this invention comprises about 5 to about 95 parts by weight of a component A comprising an ethylene-propylene block copolymer having an ethylene content of about 10 to about 50 wt %, about 95 to about 5 parts by weight of a component B comprising a polypropylene homopolymer or random copolymer of polypropylene having up to about 10 wt % of a comonomer of ethylene or an α-olefin of 4 to 8 carbon atoms.

0 to about 20 parts by weight, per 100 parts by weight of components A and B, of a component C comprising a low molecular weight polypropylene having a melt viscosity of about 50 to about 1,000 poise measured at a shear rate of 136 $sec^{-1}$ and 190° C., 0 to about 30 parts by weight, per 100 parts by weight of components A and B, of a component D comprising calcium carbonate, and 0 to about 50 ppm, per 100 parts by weight of components A and B, of a component E comprising a beta-spherulite nucleating agent with the proviso that when the weight ratio of component A/component B is about 5-30/95-70, component E is present at 0.1 to about 10 ppm, and that when the weight ratio of component A/component B is about 30-95/70-5, component C is present at (a) about 5 to about 20 parts by weight when the polymeric composition is substantially free of component D or of components D and E, and (b) about 1 to about 10 parts by weight when the polymeric composition has about 0.1 to about 10 ppm of component E and about 5 to about 30 parts by weight of component D.

These microporous films having microvoid cells and interconnecting pores between the cells are formed from polymeric compositions of this invention by a process including a step to remove beta-spherulites before orientation when the polymeric composition has a weight ratio of component A/component B of about 5-30/95-70, and the beta-spherulite nucleating agent is present at about 0.1 to 10 ppm. For oriented polymeric microporous film formed from polymeric compositions of this invention by a process including no extraction step, the polymeric composition has a weight ratio of component A/component B of about 30-95/70-5 and component C is present at about 5 to about 20 parts by weight, per 100 parts by weight of components A and B, when the polymeric composition is substantially free of component D or of components D and E, and component C is present at about 1 to about 10 parts by weight, per 100 parts by weight of components A and B, when the polymeric composition has about 0.1 to about 10 ppm of component E and about 5 to about 30 parts by weight of component D.

DESCRIPTION OF THE INVENTION

Figure 1:
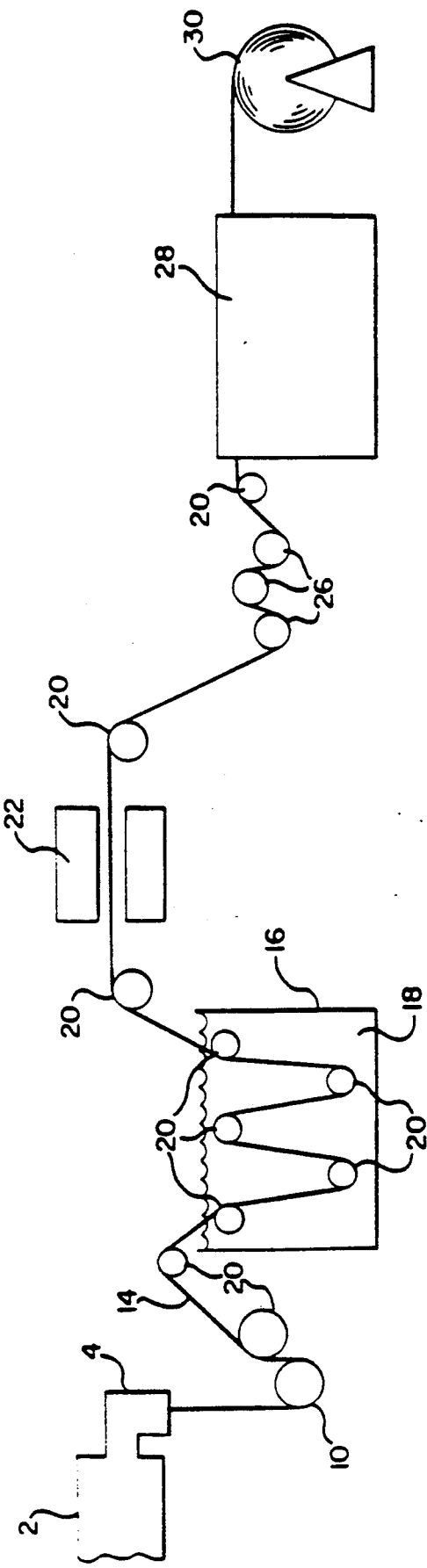
FIG. 1 is a schematic diagram showing the process for producing oriented porous film by the extraction technique from polymeric compositions of the invention.

In greater detail, the polymeric compositions capable of being converted into oriented polymeric microporous films having microvoid cells and interconnecting pores between the cells by a process which includes a beta-spherulite extraction step and by a process which includes no extraction of beta-spherulites before orientation depend on the relative concentration of the ethylene-propylene block copolymer to the polypropylene homopolymer or random copolymer of propylene and on the presence and concentration of low molecular weight polypropylene, beta-spherulite nucleating agent and inorganic filler such as calcium carbonate. Two of the two polymer components present in all of the polymeric compositions of this invention are the ethylene-propylene block copolymer and the polypropylene homopolymer or random copolymer of propylene containing up to 10 wt % of other comonomers.

The ethylene-propylene block copolymer is an ethylene-propylene block copolymer having an ethylene content of about 10 to about 50 wt % and containing crystalline polypropylene and polyethylene segments. The crystalline polypropylene segment has a melting point between 150° to 165° C. as measured by Differential Scanning Calorimetry (DSC), and preferably for optimum porous film properties a melting point between 157° to 163° C. The heat of fusion, also measured by DSC, is in the range of about 2 to 15 cal/g, preferably in the range of 5 to 10 cal/g. The crystalline polyethylene component has a DSC melting point of 100° to 135° C., preferably 115° to 125° C., and a DSC heat of fusion of about 0.2 to 10 cal/g, preferably 0.5 to 3 cal/g. The melt flow rate (MFR) according to ASTM D1238 of the ethylenepropylene block copolymer is typically about 0.5 to about 5.0 dg/min. Such block copolymers and methods for production thereof are known, as for example, a process for polymerizing propylene and ethylene in a multiplicity of steps in a polymerization system in the presence of a Ziegler-type stereospecific catalyst or a Ziegler-type stereospecific catalyst component of a carrier-supported transition metal compound and an organoaluminum compound. Such block copolymers can also be commercially available, for example, Hifax TM RA-061, a thermoplastic olefin of Himont Inc., which has a nominal MFR according to ASTM D1238 of 0.8 to 1.0 dg/min, a density of 0.88 g/cm$^3$ and typical melt processing temperatures of 193° to 227° C. Particularly preferred for producing highly breathable oriented microporous film as measured by MVTR, determined according to ASTM E-96, procedure E, is an ethylene-propylene block copolymer having an ethylene content of about 30 to about 45 wt %.

The polypropylene component is a polypropylene homopolymer or random copolymer of propylene having up to 10 wt % of another comonomer or mixtures of comonomers such as ethylene or an α-olefin of 4 to 8 carbon atoms. These homopolymers or random copolymers of propylene have at least 40% crystallinity and typically at least 50% crystallinity as determined by x-ray diffraction analysis. The polypropylene component can have any degree of polymerization so long as the resulting polymeric composition is capable of being melt-extruded into a film, although it is preferable that the polypropylene component have a MFR of about 1.0 to about 30 dg/min measured at 230° C. under a load of 2.16 kg as specified by ASTM D1238. Polymeric compositions having polypropylenes with a MFR of less than 1.0 or greater than 30 dg/min generally are not easily converted into oriented polymeric microporous films having desirable strength and breathability properties. For ease of processing and production of porous films with desirable properties, a particularly preferred range of MFR is about 2.0 to about 5.0 dg/min.

The low molecular weight polypropylene component of the polymeric compositions comprises a polypropylene homopolymer having a weight average molecular weight in the range of about 30,000 to about 100,000. Particularly preferred is low molecular weight polypropylene (LMWPP) having a melt viscosity of about 50 to about 1,000 poise when measured at a shear rate of 136 sec$^{-1}$ and a temperature of 190° C., and most preferred is a polypropylene having a melt viscosity of about 70 to about 550 poise measured at the same conditions. It is contemplated that the low molecular weight polypropylene component can also be provided by the homopolymer or random copolymer of propylene component when such component has such a broad molecular weight distribution that the portion of low molecular weight polypropylene required in the polymeric composition is included in the amount of low molecular weight material of the polypropylene component. Copolymers of α-olefins such as ethylene, butene and mixtures of these with propylene and other modified ethylene polymers such as impact modifiers, ethylene-propylene rubber, ethylene methyl acrylate, ethylene vinyl acetate, and the like, as well as polybutene can replace a part, usually less than 50%, of the low molecular weight polypropylene component. Suitable low molecular weight polypropylenes can be made by known techniques and also are commercially available, for example, from Polyvisions Inc. as Proflow-1000 and Proflow-3000.

In addition to the polymer components of the polymeric compositions of this invention, nonpolymeric components such as beta-spherulite nucleating agents and inorganic fillers such as calcium carbonate can also be present. Commonly assigned U.S. Pat. No. 4,975,469 and the references cited therein, incorporated herein by reference, disclose beta-spherulite nucleating agents such as the gamma-crystalline form of a quinacridone colorant, the bisodium salt of orthophthalic acid, the aluminum salt of 6-quinizarin sulfonic acid and to a lesser degree isophthalic and terephthalic acids. The nucleating agents are typically used in the form of powdered solids. To produce beta-spherulites efficiently the powder particles of the nucleating agent should be less than 5 microns in diameter and preferably no greater than 1 micron in diameter. The preferred beta-spherulite nucleating agent that may be used in the polymeric compositions of this invention is the gamma-crystalline form of a quinacridone colorant. One form of the quinacridone colorant is red quinacridone dye, hereinafter also referred to as "Q-dye", having the structural formula

The inorganic fillers which can optionally be used in the polymeric compositions of this invention are solid inorganic metal salt particles which are non-hygroscopic, light-colored, water insoluble, highly pure, easily pulverized, finely divided, and have densities below 3.0 g/cc and melting points above polymer degradation temperatures. Calcium carbonate particles, which are preferred, can be in any suitable naturally occurring or man-made form. Naturally occurring forms include the rather pure crystals of calcite with a hexagonal geometric form and aragonite with an orthorhombic geometric form. The melting point of greater than 800° C. for calcium carbonate is in excess of any temperatures that might typically be used, even momentarily, to process thermoplastic polymers. The calcite form of calcium carbonate has a rating of 3 on the Moh's Scale of Hardness, barely above gypsum, and this degree of softness permits easy and rapid pulverizing. Suitable man-made, highly pure, commercially available forms of calcium carbonate include precipitated chalk and the like with very finely divided, pure particles in the range of 0.05 to 10 microns. Preferably, calcium carbonate with average particle size of about 0.1 to about 10 microns is used in the polymeric compositions of this invention to form highly breathable porous film. Calcium carbonate is aptly described as "water insoluble" in that it cannot be dissolved in deionized water to a sufficient extent to form a 0.1 wt % aqueous solution at 23° C. Even at temperatures up to 100° C., the maximum solubility of $CaCO_3$ in deionized water is about 0.002 wt %. Calcium carbonate is sensitive to acid, but is generally non-reactive with polymers such as polyolefins and polyurethanes or with organic materials such as plasticizers; it is, for all practical purposes, substantially neutral in organic media.

Calcium carbonate is non-hygroscopic in the sense that it does not pick up moisture from the air, and particles of this salt do not have a tendency to "cake" or agglomerate due to absorbed moisture. Commercial grades of sodium chloride, for example, are generally too hygroscopic to be conveniently used in this invention. The specific gravity of hexagonal calcium carbonate is only slightly above 2.7, and all forms of the salt have a specific gravity of less than 3.

Other inorganic salts with properties similar to calcium carbonate, e.g., the alkaline earth metal carbonates and sulfates of low solubility such as magnesium carbonate, calcium sulfate and barium sulfate can be substituted for calcium carbonate. Generally, however, these other salts lack one or more of the advantages of calcium carbonate. Barium sulfate is water insoluble, soft with a Moh's Hardness value of 2.5 to 3.5, very high melting, and generally white or light colored in finely divided form, but its specific gravity of almost 4.5 detracts from the prospect of making light weight films which contain high loadings of unbleached filler. Calcium sulfate is low in hardness, low in density, light in color, and very high melting, but is more water soluble than calcium carbonate. Being capable of acidic behavior, this salt is not neutral and may react with some organic polymers at elevated temperatures. Magnesium carbonate is more neutral and water insoluble, but is slightly harder, slightly denser, and subject to decomposition at relatively low temperatures, e.g., 350° to 400° C.

It is within the scope of the polymeric compositions of this invention to use inorganic fillers having a variety of colors, or to add color to them. Calcite, for example, occurs naturally in a wide variety of colors. The inorganic filler can act as a pore or channel forming agent as well as a pigmentation agent. By adding small amounts of calcium carbonate to the polymeric compositions of this invention, the breathability of the oriented film is enhanced by the action of polymer pulling away from the calcium carbonate to create voids during orientation. The particles of $CaCO_3$, after stretching, are located within the walls defining the pores or otherwise associated with the porous film structure, and can impart both color and opacity to the oriented polymeric microporous films.

In preparing the polymeric compositions of this invention, the composition components can be added to conventional blenders such as roll mills, drum tumblers, double-cone blenders, ribbon blenders, and the like, or any two or more of the components can be preblended or formed into a masterbatch and mixed with the remaining components in conventional blenders. The beta-spherulite nucleating agent generally in the form of powder can be dispersed in mixtures of polymeric components by any of the procedures normally used in the polymer art to ensure uniform mixing of powder and polymer resin. For example, the Q-dye in powder form can be blended with the polymer components in powder or pellet form or the Q-dye can be slurried in an inert medium and the slurry used to coat the polymer powder or pellets. Alternatively, mixing at elevated temperatures can be accomplished by using, for example, a roll mill or multiple passes through a melt-compounding extruder. A preferred mixing procedure is the blending of the nucleating agent in powder form with polymer pellets or powder followed by melt-compounding the resulting mixture in a single-screw or multiple-screw extruder. Multiple passes may be necessary to ensure the desired level of dispersion of nucleating agent in the polymer. This procedure can also be used to form a masterbatch of nucleating agent and polymer. It is important that a homogeneous composition be formed so that films obtained from the polymeric composition have a uniform distribution of the polymer components and beta-spherulite nucleating agent in order that oriented polymeric microporous films with uniform strength and breathability are obtained.

For polymeric compositions of this invention which are capable of being converted into an oriented polymeric microporous film by a process including the extractive removal of beta-spherulites to form a porous film with a subsequent orientation step, the polymeric composition comprises about 5 to about 30 parts by weight of the ethylene-propylene block copolymer, about 70 to about 95 parts by weight of the polypropylene homopolymer or random copolymer of propylene and about 0.1 to about 10 ppm of the beta-spherulite nucleating agent. Porous films prepared by this process from compositions containing less than 5 parts by weight of the ethylene-propylene block copolymer do not exhibit the improved aesthetic qualities such as softer hand and decreased noise generation when flexed, whereas films prepared from compositions containing more than 30 parts by weight of the ethylene-propylene block copolymer do not exhibit sufficient porosity. Oriented porous films prepared from compositions comprising about 5 to about 30 parts by weight of the ethylene-propylene block copolymer by a process including the formation of a porous film by the extractive removal of beta-spherulites from a film containing beta-spherulites with subsequent orienting of the porous film have improved aesthetic qualities such as a softer hand and decreased noise generation when flexed and good breathability properties as measured by the MVTR.

The amount of beta-spherulite nucleant useful in forming porous films by the extractive removal of beta-spherulite technique from the polymeric compositions of this invention depends on the effectiveness of the particular nucleant for inducing beta-crystals and the amount of porosity desired in the porous film produced from the composition. For Q-dye, the amount present in the polymeric compositions can range from about 0.01 to about 50 ppm by weight. Sufficient nucleating agent is employed to induce the formation of 20 wt % or more of beta-spherulites in the film. Preferably, about 0.1 to about 10 ppm by weight of Q-dye is utilized. Other things being equal, less than about 0.01 ppm of Q-dye has a negligible effect on the level of beta-form spherulites present in the film, and amounts greater than 50 ppm do not significantly increase the amount of beta-spherulites formed. For compositions with about 0.1 to about 10 ppm of Q-dye acting as a nucleating agent and formed into a film, a sufficient amount of beta-spherulites is formed in the film such that a high porosity film is formed when the film is extracted with toluene, carbon tetrachloride or xylene. With a subsequent orientation step, a film having increased porosity and breathability is formed.

For compositions including a beta-spherulite nucleating agent, a critical parameter in the formation of beta-spherulites in the film is the rate at which the film is cooled. Other parameters being equivalent, the more rapid the cooling, the smaller the size of the beta-spherulites formed. If the molten film is cooled too rapidly, it is possible that essentially no beta-spherulites are formed. Conversely, the slower the film is cooled, the larger the size of the beta-spherulites formed. Little or no beta-spherulites are formed below about 80° C. or above about 130° C. The cooling conditions needed to achieve the desired beta-spherulite size can be controlled by one or more of the following parameters: polymer melt temperature, extrusion rate, drawdown ratio, die gap and chill roll temperature for extruded film, and cooling air velocity and temperature for blown film. Other things being equal, an increase in one of the following parameters results in a decrease in the rate at which the molten film is cooled or quenched and, consequently, an increase in the size of the beta-spherulites formed: polymer melt temperature, extrusion rate, die gap, cooling air temperature, and chill roll temperature. Conversely, other things being equal, a decrease in one of these variables results in a decrease in the size of the beta-spherulites. By contrast, other things being equal, an increase in either the drawdown ratio or cooling air velocity results in an increase in the quench rate and an associated decrease in the size of the beta-spherulites formed.

For polymeric compositions of this invention capable of being formed into microporous films by a process including the extraction of beta-spherulites from formed films, the film is ordinarily at least about 0.005 millimeters in thickness. The useful maximum thickness depends on the time of extraction of the beta-spherulites. Other things being equal, the thicker the film, the longer the time required to extract a given percentage of the total beta-spherulites present. The beta-spherulites formed in the film can be extracted with nonpolar, organic solvents. For ease of operation, it is preferred that the extracting medium have a boiling point greater than about 100° C. It is possible to utilize mixtures of two or more organic solvents and in such an event the lower boiling solvent should have a boiling point greater than about 100° C. Preferred extraction solvents include toluene, carbon tetrachloride, and xylene, with toluene being most preferred. Any conventional extractive technique used in the extraction of films can be used. Particularly useful are processes which include temperature- and environment-controlled extraction vessels which permit complete immersion of the films in the extraction solvent at a controlled temperature and under conditions in which any extraction solvent vapors are contained.

The extraction conditions are critical in selectively removing at least a portion of the beta-spherulites while minimizing the amount of alpha-form crystalline polypropylene removed. Removal of the beta-form crystals is very temperature dependent. If the extraction temperature is too low, the beta-spherulites are removed too slowly or not at all; and, if the extraction temperature is too high, alpha-form crystals are dissolved along with the beta-form. The optimum temperature of extraction depends on the particular extraction medium used and can be readily determined by one skilled in the art. For the preferred extracting medium, toluene, the extraction is preferably accomplished in the temperature range of about 85° to about 95° C., most preferably about 88° to about 93° C. It has also been found that for films containing cornstarch extraction temperatures of about 3° to 5° C. less can be used.

The extraction time, used herein to mean the time the film contacts the extracting medium at the extraction temperature, relates to the extraction temperature. Other things being equal, the higher the extraction temperature, the shorter the extraction time; conversely, the lower the extraction temperature the longer the film must be in contact with the extraction medium to remove a given amount of beta-spherulites. The length of the extraction time can be used to control the degree of porosity to some extent since at a given extraction temperature greater quantities of the beta-spherulites can remain in the film as the extraction time is decreased. It is preferred that at least 15 wt % of the beta-spherulites be extracted as measured by weight loss in the extracted film. The extraction time also depends on the thickness of the film being extracted. At a given temperature, the extraction time increases as the film becomes thicker. Ordinarily the extraction time ranges from about 1.5 to about 20 minutes. Preferably, the extraction time is 10 minutes or less.

The extracted film can be dryed at a drying station to remove any extraction solvent which remains with the film. The drying station can be any conventional means used to remove materials such as extraction solvents. Devices such as radiant heaters can be employed with the preferred drying method utilizing a blower for impinging heated air on the film. With both the drying station and the extraction vessel, environmental procedures involved in handling extraction solvents and their vapors are utilized. It is preferred that extraction vessels and the drying stations be contained in a housing equipped with exhaust and volatiles treatment facilities to minimize loss of the extraction solvent to the environment.

In the orienting step, the extracted, porous film can be stretched uniaxially or biaxially at stretch ratios of about 1.5 to about 7.5. Uniaxial stretching methods include rolls, and a roll or tenter for restraining the film. Biaxial stretching methods include successive uniaxially stretching comprising longitudinal stretching by rolls and transverse stretching by a tenter and simultaneous biaxial stretching using a tenter. For biaxial stretching, the stretch ratio in the longitudinal or machine direction and transverse direction may be the same or different. Preferably the thickness of oriented films produced from the polymeric compositions of this invention ranges from about 0.005 millimeters to about 0.2 millimeters in thickness. The unstretched porous films from which the oriented films are formed range in thickness from about 0.01 to about 0.4 millimeters.

With reference to FIG. 1, a polymeric composition of about 70 to about 95 wt % of propylene, about 5 to about 30 wt % of an ethylene-propylene block copolymer having about 10 to about 50 wt % ethylene and a beta-spherulite nucleant is formed into a melt in extruder 2. The melt temperature is in the range of about 180° to about 270° C., preferably about 200° to about 240° C. The melt is fed into a slot die 4 from which the melt is extruded as a film. Commonly, the slot die opening ranges from about 0.25 to about 1.2 millimeters. As the extruded film emerges from the die and starts to cool, it contacts a chill roll 10 and is cooled further by chill roll 10 maintained at a temperature of about 80° to about 130° C. The polymer melt temperature, extrusion rate, drawdown ratio, slot die opening and chill roll temperature can be used to control the rate of cooling the film and thereby the size of the beta-spherulites as discussed hereinabove.

The flat film tube 14 passes into an extraction vessel 16 which contains a non-polar solvent 18 used to selectively extract the beta-spherulites. A series of rollers 20 are used to maintain tension in the film. The extraction vessel 16 can be equipped with a heating means (not shown), such as steam traced lines or the extraction vessel 16 can be immersed in a temperature controlled bath containing liquids such as silicone oil, capable of maintaining the extraction solvent at the desired extraction temperature. Any commercially available controlling means can be employed to control the temperature of the extracting solvent preferably to within 0.5° C. The extraction vessel 16 can also be equipped with a means (not shown) for introducing fresh extraction solvent into the vessel and removing spent solvent containing dissolved resin from the vessel. The spent solvent can be diverted into a recovery section (not shown) where the solvent can be separated from the dissolved resin, for example, by flashing the solvent and condensing the vapor. The recovered polymer, containing nucleant, can be blended in appropriate amounts with fresh base resin and used to produce film.

The extracted film is transported through a drying station 22 utilizing a blower for impinging heated air on the film to remove any extraction solvent which remains with the film. With both the drying station and the extraction vessel, environmental procedures involved in handling extraction solvents and their vapors are utilized. It is preferred that both the extraction vessel 16 and the drying station 22 be contained in a housing equipped with the appropriate exhaust and volatiles treatment facilities to minimize loss of the extraction solvent to the environment.

The dried film is heated by heating rolls 26 to a temperature of about 110° to about 135° C. for about 2 to about 20 seconds before being oriented on a tenter stretcher 28. The stretching can be uniaxial or biaxial at stretch ratios of about 1.5 to about 7.5. The oriented porous film is wound onto a take-up roll 30.

In a particular embodiment, an oriented polymeric porous film having polygonal cells with average greatest dimensions of about 5 to about 30 microns and interconnecting pores between the cells having average diameters of about 0.2 to about 20 microns is formed by the process comprising the steps of:

(a) forming a film comprising a blend of polypropylene, about 5 to about 30 wt % of an ethylene-propylene block copolymer having an ethylene content of about 10 to about 50 wt % and a nucleating agent capable of producing beta-spherulites;

(b) cooling said film below the crystallization temperature of said blend to form at least 20 wt % of beta-spherulites in the film;

(c) extracting selectivity said beta-spherulites in an amount corresponding to at least 15 wt % of the blend from the cooled film with an extraction solvent to form a porous film; and (d) orienting the porous film by heating the porous film at a temperature of about 110° to about 135° C. and stretching the heated porous film in at least one direction at a stretch ratio of about 1.5 to about 7.5.

Modifiers added to polypropylene to improve the aesthetic characteristics of porous films included: a triblock copolymer with polystyrene endblock with unsaturated rubbery center block of either polyisoprene or polybutadiene, a triblock copolymer with polystyrene endblock with saturated rubbery center block of ethylene-propylene or ethylene-butylene random copolymer, a blend of polypropylene with crosslinked rubber, low viscosity and high viscosity polybutene. Thermal properties of these compositions were characterized via differential scanning calorimetry and cast films were characterized by X-ray diffraction analysis in order to quantify the level of beta crystallinity present. An empirical parameter "K", a measure of the beta crystallinity of the polymer, was measured by X-ray diffraction analysis and determined according to the equation:

$$K = H\beta_1 / (H\beta_1 + (H\delta_1 + H\delta_2 + H\delta_3))$$

where $H\beta_1$, $H\delta_1$, $H\delta_2$ and $H\delta_3$ are the reflection intensities of the (300) plane of the beta crystals and the (100), (040) and (130) planes of the alpha crystals, respectively. The value of K varies from 0 to 1 for films that contain all alpha or all beta crystals, respectively. The beta-spherulite content of the cast film as measured by the value of K generally increased as the nucleant concentration increased from 1 to 4 ppm.

The highest K value was obtained for a film produced from a polymeric composition of 80 wt % polypropylene and 20 wt % ethylene-propylene block copolymer. When this film was extracted in toluene at 90° C., a film was obtained that was uniformly white and opaque with a porosity of 17 to 20%. Extracted film formed from compositions with other modifiers had poor appearance with very little whiteness and opaqueness indicating a low level of porosity.

For film formed from a composition of polypropylene and ethylene-propylene block copolymer, the immersion of the film in hot toluene did not extract the ethylene-propylene block copolymer along with the beta-spherulites as indicated by the extraction level and film appearance being consistent with the beta-spherulite content of the film. For compositions containing triblock copolymer with polystyrene endblock, the toluene treatment appeared to remove the modifiers without imparting porosity to the film.

All films formed from compositions of polypropylene and a second polymeric component had lower modulus and tensile strengths compared with film formed from polypropylene. Film prepared from polypropylene and ethylene-propylene copolymer had the highest modulus and the film was very uniform and homogeneous with good strength and ductility in both the machine direction (MD) and cross-machine direction (CD) or transverse direction (TD). Tensile property data obtained on extracted film produced from a composition of polypropylene and ethylene-propylene block copolymer and from polypropylene homopolymer indicated that break elongations in both the MD and TD direction were up to fivefold greater for the composition film than for the polypropylene film. The composition film also showed an improvement of about 20 wt % in tensile strength and had a smaller reduction in modulus compared to the polypropylene film.

Samples of extracted film prepared from polypropylene homopolymer and compositions of polypropylene with ethylene-propylene copolymer were stretched on a T. M. Long Stretcher at stretch ratios of 2:1 and 2.5:1 and at temperatures ranging from 110° to 127° C. and measured for MVTR and porosity. Both the composition and homopolymer films exhibit similar MVTR behavior when compared at similar stretch ratios. As the stretching temperature is lowered both types of films exhibit an increase in MVTR. If the orientation temperature was too low, however, the film had a greater tendency to tear. Extracted films of homopolymer polypropylene have been successfully stretched at a temperature as low as 115.6° C., whereas the composition film was successfully drawn at a temperature as low as 110° C. For films formed from the composition slightly lower porosities were achieved under a given set of conditions for the composition film however even with the lower porosity, no deficiency in MVTR was observed for the composition film. Tensile properties for biaxially stretched composition and homopolymer film indicate that the composition film has almost twice the tensile strength and more than double the break elongation of the homopolymer films. The composition film had a softer hand or feel relative to the homopolymer film.

Films were formed from nucleated compositions prepared containing 50, 75 and 100 wt % of ethylene-propylene block copolymer. These nucleated copolymer films had excellent drape and hand due to the reduced modulus. However, when these nucleated copolymer films were extracted in hot toluene, the films became thinner, but did not become microporous.

For the facile process for preparing oriented polymeric microporous films from compositions of this invention which does not require a beta-spherulite extraction step, the polymeric composition comprises about 30 to about 95 parts by weight of the ethylene-propylene block copolymer having an ethylene content of about 10 to about 50 wt %, about 5 to about 40 parts by weight of polypropylene homopolymer or random copolymer having up to 10 wt % of a comonomer of ethylene or an α-olefin of 4 to 8 carbon atoms, and low molecular weight polypropylene homopolymer having a melt viscosity of about 50 to about 1,000 poise measured at a shear rate of 136 sec$^{-1}$ and 190° C. such that the low molecular weight polypropylene is present in the polymeric composition in an amount from about 1 to about 10 parts by weight when the polymeric composition additionally comprises a beta-spherulite nucleating agent and about 5 to about 30 parts by weight of a calcium carbonate, and from about 5 to about 20 parts by weight when the polymeric composition additionally comprises a beta-spherulite nucleating agent but is substantially free of calcium carbonate or when the polymeric composition is substantially free of calcium carbonate and the nucleating agent, The beta-spherulite nucleating agent can be present as the red quinacridone dye, Q-dye, at about 0.1 to about 50 ppm by weight and calcium carbonate can be present at about 5 to about 30 parts by weight, based on 100 parts by weight of the ethylene-propylene block copolymer and polypropylene homopolymer or random copolymer of propylene. Particularly preferred polymeric compositions for forming oriented microporous films with a MVTR of 500 g/m$^2$/24 hr or greater comprise about 45 to about 75 parts by weight of the ethylene-propylene block copolymer and about 20 to about 35 parts by weight of the polypropylene homopolymer. Films formed by the nonextraction technique from polymeric compositions having less than 30 or more than 95 parts by weight of ethylene-propylene block copolymer do not exhibit sufficient porosity and breathability.

In general, the low molecular weight polypropylene component is present in polymeric compositions used to make microporous film by the nonextractive technique and is absent in film prepared by the process using the beta-spherulite extraction technique. For polymeric compositions comprising ethylene-propylene block copolymer, polypropylene, low molecular weight polypropylene with or without beta-spherulite nucleating agent, the low molecular weight polypropylene is preferably present in the composition at about 5 to about 20 parts by weight. For polymeric compositions comprising, in addition to the three polymeric components, the beta-spherulite nucleating agent and an inorganic filler such as calcium carbonate, the low molecular weight polypropylene is preferably present in the composition at about 1 to about 10 parts by weight. For polymeric compositions in which the low molecular weight compositions are outside the preferred ranges, the resulting oriented porous films are generally less facile to form and have lower breathability and strength properties.

Incorporation of a low molecular weight polyolefin such as polypropylene homopolymer having a melt viscosity of about 50 to about 1,000 poise measured at 136 $sec^{-1}$ and 190° C. into compositions of ethylene-propylene block copolymer and polypropylene homopolymer or copolymer of propylene significantly increases the breathability of microporous films made from these compositions by stretching and without an extraction step. Film made from compositions containing greater than 20 parts by weight of the low molecular weight polyolefin have a greater tendency to tear during stretching. For one preferred embodiment of this invention in which the compositions capable of being formed into microporous films additionally comprise a beta-spherulite nucleating agent, the low molecular weight polyolefin can range from 5 to about 20 parts by weight. Upon stretching, films formed from compositions having beta-spherulites exhibit increased breathability due to increased formation of interconnecting pores between the microporous cells. For another preferred embodiment of this invention in which the polymeric compositions comprise about 5 to about 30 parts by weight of $CaCO_3$ as well as a beta-spherulite nucleating agent, it has been found that the amount of the low molecular weight polypropylene can range from about 1 to about 10 parts by weight. The addition of the low level of $CaCO_3$ contributes to the formation of interconnecting pores between the microvoid cells upon stretching the film.

Scanning election microscope micrographs of the surface of uniaxially oriented films prepared from a composition of 50 wt % ethylene-propylene block copolymer having a content of 40 wt % ethylene, 35 wt % polypropylene and 15 wt % of low molecular weight polypropylene indicate that numerous elongated voids are visible which range in size from 2 to 15 microns along their major axis and 0.5 to 4 microns along their minor axis. Many of the voids appeared to contain round inclusions which had been partially pulled away from the edges of the voids and were attached to the surrounding polymer by very fine fibrils. The pull-away of the inclusions is believed to represent an adhesive fabric of the ethylene-rich dispersed domain of the ethylene-propylene block copolymer that has phase separated from the matrix polymer.

Cast films made from compositions of ethylene-propylene block copolymer, polypropylene homopolymer and the beta-spherulite nucleating agent stretched uniaxially or biaxially were shown to have a high degree of microvoiding leading to films which were porous but which had low breathability as measured by MVTR. The low breathability is believed to have been the result of many of the microvoids being of the closed-cell type and the microvoids did not form an interconnected network through which vapor can pass. Addition of a low molecular weight polyolefin in the form of a low molecular weight polypropylene (LMWPP) leads to a significant increase in the MVTR. The increase in MVTR is believed to be the result of interconnecting pores or channels being formed between the microvoids from the microscopic failure of the drawn polymer brought about by a reduction in the breaking elongation of the polymer matrix by the presence of the LMWPP.

General aspects of the film-forming processes used in this invention, e.g., pressing, calendering, or extruding of milled polymer/inorganic salt mixtures, are well known in the art. Heating of the milled mixture is conventionally involved in these film-forming methods. The particles of the inorganic salt can be added in increments during the milling step. Casting, e.g., of solutions of polymer filled with pore-nucleating particles, is not preferred.

The facile process for preparing oriented polymeric microporous films from compositions of this invention which does not require an extraction step and wherein the films have microvoid cells and interconnecting pores between the cells comprises the steps of:

(1) forming a film from a polymeric composition comprising about 40 to about 90 parts by weight of an ethylene-propylene block copolymer having an ethylene content of about 10 to about 50 wt %, about 5 to about 40 parts by weight of a propylene homopolymer or random copolymer having up to about 10 wt % of a comonomer of ethylene or an α-olefin of 4 to 8 carbon atoms, and a low molecular weight polypropylene having a melt viscosity of about 50 to about 1,000 poise measured at a shear rate of 136 $sec^{-1}$ and 190° C. with the proviso that said low molecular weight polypropylene is present in said polymeric composition at (a) about 1 to about 10 parts by weight when the polymeric composition additionally comprises a beta-spherulite nucleating agent and about 5 to about 30 parts by weight of a calcium carbonate, and (b) from about 5 to about 20 parts by weight when the polymeric composition additionally comprises a beta-spherulite nucleating agent but is substantially free of calcium carbonate or when the polymeric composition is substantially free of calcium carbonate and the nucleating agent, (2) heating the film at a temperature of about 35° to about 135° C., and (3) stretching the heated film in at least one direction at a stretch ratio of about 1.5 to about 10.

In step (1) of the process a film is formed from the polymeric composition by any suitable process known in the art for forming films from polymeric compositions and, in particular, polyolefin-based compositions. Among these are processes including melt-forming processes such as slot-die extrusion and blown-bubble extrusion, with the slot-die extrusion process preferred for ease of operation. In either the blown-bubble or the slot-die extrusion process the polymer composition is formed into a melt by a melt-forming means such as a single-screw or a twin-screw extruder. The polymeric composition together with optional additives or modifiers can be supplied in pellet or powder form to the extruder or the various composition components can be supplied directly to the melt-forming means for a combination of compounding and melting. Typically, temperatures in the extruders range from about 200° to about 280° C. and, in particular, for polyolefin-based compositions from about 220° to about 250° C. The residence time of the polymeric compositions in the extruders can vary with the size of the equipment and desired throughput but should be sufficiently long to achieve mixing and melting while at the same time avoiding degradation of polymer. In the blown-bubble extrusion process, the film is preferably cooled with a stream of air. In the slot-die extrusion process, the cooling can be accomplished with liquid in a cooling bath, such as water, a chill roll or a stream of air with chill rolls typically used. For film formed from polyolefin-based compositions with one or more chill rolls, the rolls typically have temperatures of about 80° to about 120° C.

Small amounts, usually less than about 5 parts by weight based on the total weight of the polymeric components of the composition, of other materials used in processing polymeric compositions such as lubricants, plasticizers, processing plasticizers, surfactants, water, and the like, may optionally be present. Yet other materials introduced for particular purposes may optionally be present in the polymeric compositions in small amounts, usually less than about 15 parts by weight based on the total weight of the polymeric components of the composition. Examples of such materials include antioxidants, antimicrobial agents, ultraviolet light absorbers, flame retardants, dyes, pigments, and the like. The addition of these materials can take place as the compositions are being prepared or during when the compositions are being formed into microporous film, and the addition can be made by any suitable means such as metering pumps, extruders, and the like.

A particularly useful additive in the polymeric compositions of this invention is an antimicrobial agent. As used herein antimicrobial agents include both fungicidal and antibacterial agents and are materials for deodorizing or inhibiting bacterial, fungal or microbial growth in synthetic textile articles such as surgical gowns and masks, and institutional textile products. Inhibiting fungal growth serves to protect the fabric itself, while the inhibition of bacterial growth prevents odor caused by the bacterial breakdown of organic matter. Antimicrobial agents, disclosed in U.S. Pat. No. 4,343,853 which can be added to the polymeric compositions of this invention include nitrophenylacetate, phenylhydrazine, polybrominated salicylanilides such as 5,4'-dibromosalicylanilide and 3,5,4'-tribromosalicylanilide, chlorhexidine, domiphen bromide, cetylpyridinium chloride, benzethonium chloride, 2,2'-thiobis(4,6-dichloro)phenol, 2,2'-methylenebis-(3,4,6-trichloro)-phenol and 2,4,4'-trichloro-2'-hydroxydiphenyl ether.

A particularly preferred antimicrobial agent comprises 2,4,4'-trichloro-2'-hydroxydiphenyl ether which provides suitable antimicrobial effect when present in polymeric compositions at concentrations of about 100 to about 2,000 ppm, by weight of the polymeric components of the composition. At concentration levels below 100 ppm in the polymeric composition, the antimicrobial effect generally is insufficient after the composition has been processed into a microporous film. Preferably, about 200 to about 750 ppm of 2,4,4'-trichloro-2'-hydroxydiphenyl ether, by weight of the polymeric components of the microporous film, are present to ensure retention of the microbial effect after processing.

A specific example of such an antimicrobial agent is that designated as Microban® Plastic Additive B from Clinitex Corporation of Huntersville, N.C.

The antimicrobial agent can be incorporated into the microporous film prepared from the polymeric compositions by combining the agent with the composition prior to or during extrusion of the film so that the agent is substantially uniformly dispersed in the composition in the molten state. Preferably, a concentrate or masterbatch of about 5 to about 15 wt % antimicrobial agent in the propylene homopolymer component of the polymeric composition is employed to simplify handling of the agent and to improve dispersion of the agent in the polymeric composition and microporous film prepared therefrom.

The film provided in step (1) can be obtained directly from the film forming operation or it can be wound on a take-up roll and provided to step (2) from these take-up rolls. Steps (2) and (3) include hearing and stretching steps, respectively, by which the provided film is rendered microporous. The film is heated by any suitable heating means for a time and at a temperature such that the film attains the desired temperature in as short a time as possible while retaining properties of the film. Typically, heating rolls are used to heat the film to the desired orientation temperature. For films stretched simultaneously in both directions the desired temperature ranges from about 40° to about 95° C. For films formed from polypropylene-based compositions, the films are preferably heated from about 70° to about 85° C. The desired temperature ranges for films which are stretched in the machine direction and subsequently stretched in the transverse direction are different for the two operations. The desired temperature for orientation in the machine direction can range from about 40° to about 95° C., with a preferred temperature range of about 60° to about 70° C. for films formed from polyolefin-based compositions. In the subsequent transverse direction orientation, the desired temperature can range from about 75° to about 140° C., with a preferred temperature range of about 105° to about 120° C. for polyolefin-based compositions. Attempts to orient films at temperatures outside the preferred temperature ranges typically do not produce films with the desired porosity and strength properties.

In addition to the type of orientation, the composition of the film also influences the orientation temperature. For films comprising ethylene-propylene block copolymer, polypropylene homopolymer or random copolymer of propylene and low molecular weight polyolefin the films are preferably heated to a temperature of about 50° to about 80° C. For films comprising ethylene-propylene block copolymer, propylene homopolymer or random copolymer, low molecular weight polyolefin, a beta-spherulite nucleating agent and/or an inorganic filler such as calcium carbonate the films are preferably heated to a temperature in the range of about 35° to about 135° C.

In step (3) the heated film can be stretched uniaxially or biaxially. Uniaxial stretching can be performed using rolls with a roll or tenter for restraining the film. Biaxial stretching can include successive uniaxial stretching steps comprising longitudinal stretching by rolls and transverse stretching by a tenter, simultaneous biaxial stretching using a tenter and the like. For biaxial stretching, the stretch ratio in the longitudinal or machine direction and transverse direction may be the same or different. Generally, the stretch ratios are the same in both directions. The stretch ratio for either uniaxial or biaxial orientation can be about 1.5 to about 10. The preferred method of biaxial stretching includes the formation of a film by extruding a film with a small amount of MD orientation usually less than 25% of the total MD orientation. The formed film is further oriented in the MD followed by orientation in the TD such that the ratio of the final MD to TD orientation draw ratio is about 0.8 to 1.2. The preferred stretch ratio for biaxial stretching is about 1.5 to about 5 and for uniaxial stretching about 1.5 to about 6.

The oriented polymeric microporous films formed from the polymeric compositions of this invention can be made within a wide range of film thickness or caliper. For the uses contemplated for these films, a thickness of more than 0.005 mm and less than about 2 mm is generally preferred. Films having a thickness in the range of about 0.01 to about 1 mm are particularly useful. A measurable decrease in caliper or thickness normally occurs after the stretching step. For uniaxial orientation, this decrease can be as much as one-third of the thickness of the unoriented film. For biaxial and uniaxial orientations with very high stretch ratios, the decrease in thickness can be even greater. Preferably, the thickness of oriented films produced by this invention ranges from about 0.005 to about 1.0 mm in thickness. The unstretched films from which the oriented films are formed range from about 0.01 to about 2.0 mm.

In one embodiment of the process for forming an oriented microporous polymeric film from the polymeric compositions of this invention, wherein the film has a thickness of about 0.005 to about 0.2 mm and a MVTR determined according to ASTM E-96, procedure E, of about 1,500 g/m²/24 hr or greater, the process comprises the steps of:

(a) forming a film having a thickness of at least 0.1 mm and at least 20 wt % beta-spherulites from a polymeric composition comprising, per 100 parts by weight of the composition, about 40 to about 90 parts by weight of an ethylene-propylene block copolymer having an ethylene content of about 30 to about 45 wt %, about 5 to about 40 parts by weight of a polypropylene having a MFR of about 1.0 to 30 dg/min as determined according to ASTM D1238, about 5 to about 20 parts by weight of a low molecular weight polypropylene having a melt viscosity of about 50 to about 1,000 poise measured at a shear rate of 136 sec$^{-1}$ and a temperature of 190° C., and about 0.1 to about 10 ppm of a red quinacridone dye on a cast film line with an extruder having a polymer melt temperature of about 200° to about 240° C., slot die opening dimensions of about 0.25 to about 1.2 mm, and chill roll temperatures of about 70° to about 120° C., (b) heating the film to a temperature in the range of about 50° to about 80° C., and (c) stretching the heated film in at least one direction at a stretch ratio of about 1.5 to about 6.

In yet another embodiment, the process for forming an oriented microporous polymeric film from the polymeric compositions of this invention wherein the film has microvoid cells and interconnecting pores between the cells and a MVTR determined according to ASTM E-96, procedure E, of about 3,000 g/m²/24 hr or greater comprises the steps of:

(a) forming a film on a cast-film line having chill roll temperatures of about 85° to about 110° C. from a polymeric composition comprising per 100 parts by weight of the composition, about 40 to about 90 parts by weight of an ethylene-propylene block copolymer having an ethylene content of about 30 to about 45 wt %, about 5 to about 40 parts by weight of a polypropylene having a melt flow rate of about 1.0 to 30 dg/min as determined according to ASTM D1238, about 1 to about 10 parts by weight of a low molecular weight polypropylene having a melt viscosity of about 70 to about 500 poise measured at a shear rate of 136 sec$^{-1}$ and 190° C., about 5 to about 30 parts by weight of calcium carbonate having an average particle size in the range of 0.1 to 10 microns, and about 0.1 to about 10 ppm of a red quinacridone dye having the structural formula:

(b) heating the film to a temperature in the range of about 35° to about 135° C., and (c) stretching the heated film biaxially with a stretch ratio in the machine direction of about 1.5 to about 4 and a stretch ratio in the transverse direction of about 1.5 to about 4.

The oriented microporous film made from the polymeric compositions of this invention can be incorporated as one or more layers into composite structures with supporting materials such as a polymeric foam material, a woven fabric or a nonwoven fabric such as a carded web of staple fibers, a spunbond fabric, a meltblown fabric, a self-bonded nonwoven web such as RFX® fabric and cross-laminated fibrillated film fabrics such as CLAF fabric. The layers can be adhered to each other or laminated together by conventional methods such as adhesive bonding, thermobonding, or other techniques which do not significantly decrease the vapor permeable and liquid impermeable properties of the porous film. For example the microporous films can be adhered to CLAF fabric made of polypropylene by thermobonding and to CLAF fabric made of polyethylene by adhesive bonding.

Films made from the polymeric compositions of this invention may be employed in a wide variety of applications where their microporous structures are useful including the apparel, membrane and ultrafiltration areas. Among the applications contemplated are filters, separators in electrochemical cells, reverse osmosis membranes, house wrap, covers for equipment such as automobiles, motor bikes, stationary equipment and the like, breathable bandages and other vapor permeable first aid dressings, surgical drapes and protective garments for use in hospitals and in electronic clean rooms or other areas where chemical spills may be a problem, conformable and printable backings for coated and laminated articles, typewriter and other inking ribbons, sheets or pads, breathable garments, or clothing materials of footwear such as leather substitutes or rainwear, battery separators, breathable shoe inserts or insole material, flexible gas-permeable containers such as sterilizable packages for surgical instruments and the like.

Stretched porous film containing starch can be used in disposable applications such as diapers and agricultural mulch film. Mulch film can also have about 5 to about 15 wt % cornstarch incorporated into it. For agricultural mulch film, the starch-containing porous film can be impregnated with pesticides and/or fertilizers which are released over the growing season. The starch-containing mulch film upon exposure to the sun during the growing season degrades sufficiently so that the film can be plowed under at the end of the growing season without costly removal and disposal. The films should also prove useful in the application of making pressure sensitive labels wherein the oriented polypropylene microporous films offer the advantage of improved drying characteristics and printability of the labels and lower water absorbency compared to paper when water-based adhesives are used and improved adhesive curing is obtained from the moisture release through the porosity of the microporous film.

Description of test procedures used to determine properties reported for the examples of this invention and comparative examples are as follows:

Melt Flow Rate-Melt flow rates of polyolefin resin samples were measured according to ASTM D1238-70.

Tensile Strength and Elongation-Test specimens of 2.54 cm wide samples of the films were used to determine tensile strength and elongation according to ASTM D-1682. The tensile strength was measured in the machine direction and in the transverse direction and is reported in units of pounds or grams.

Basis Weight-The basis weight of films was determined by weighing a one-foot square representative sample of the film on a digital balance to ±0.01 g. This weight was used to calculate the basis weight of the film in units of $oz/yd^2$ or $g/m^2$.

Moisture Vapor Transmission Rate-The moisture vapor transmission rate (MVTR) was determined according to ASTM E-96 Procedure E in units of $g/m^2/24$ hr.

Porosity-The porosity of films was calculated from the density of a one-foot square sample of film determined by weighing the sample to ±0.01 g and measuring the film thickness to calculate a density and calculating the porosity of the film by the equation:

$$P = (1 - (D_f/D_i)) \times 100$$

wherein $D_f$ is the final density calculated from the film sample weight and thickness, $D_i$ is the initial density of the film which for polypropylene-based film a value of 0.905 g/cc was used and for polypropylene-based film containing 14 wt % calcium carbonate a value of 1.0 g/cc was used.

The following examples further elaborate the present invention although it will be understood that these examples are for purposes of illustration and are not intended to limit the scope of the invention.

EXAMPLE 1

A composition of ethylene-propylene block copolymer, Hifax RA-061 from Himont, containing 40 wt % ethylene and nucleated polypropylene homopolymer pellets containing 1.5 ppm of the Q-dye beta-spherulite nucleant was prepared in a 19 mm Brabender extruder having a single stage mixing screw. The homopolymer polypropylene from Amoco Chemical Company had a MFR of 3.2 dg/min determined according to ASTM D1238. Cast films were made from the compositions on a 38 mm Davis Standard single screw extruder using a 30.5 cm wide slit film die. The cast films ranged from 3 to 4 mils in thickness and were 26.7 cm wide. The extrusion conditions were as follows:

| | |
|---|---|
| Polymer melt temperature: | 226.7° C. |
| Extruder screw speed: | 23 rpm |
| Extruded film speed: | 156 feet/min (fpm) |
| Chill roll temperature range: | 107.8-108.3° C. |

The cast film was wound on a feed roll and beta-spherulites were extracted from the film by feeding the film into a tank containing toluene at a temperature of 88° to 92° C. The line speed of the cast film was adjusted to give the desired residence time in the toluene bath and after the film exited the tank it was sent through a series of rollers maintained at temperatures of 90° to 135° C. on which the film was dried. The solvent-swollen film shrunk back to its original dimensions during the drying process and became white/opaque in appearance due to light scattering from the numerous created voids. The extracted film was stretched biaxially on a T. M. Long stretcher at stretch ratios of 2:1 to 2.5:1 and temperatures ranging from 110° to 127° C.

Thermal and tensile properties of the extracted films of Example 1 are summarized in Table I.

TABLE I

| Thermal and Tensile Properties | |
|---|---|
| Property | |
| Tc, °C. | 119.1 |
| K value | 0.28 |
| Thickness, mil | 3.2 |
| Tensile Strength, psi | |
| MD | 3,140 |
| TD | 2,330 |
| Elongation, % | |
| MD | 254 |
| TD | 85 |
| Modulus, kpsi | |
| MD | 90 |
| TD | 84 |

Tc - Crystallization Temperature
MD - Machine Direction
TD - Transverse Direction The stretch ratios, stretching temperature, thickness, porosity and MVTR data of films of Example 1a-1e stretched at different biaxial stretch ratios and various temperatures are summarized in Table II.

TABLE II

| FILM POROSITY AND MVTR PROPERTIES | | | | | |
|---|---|---|---|---|---|
| Example | Stretch Ratio | Stretching Temp., °C. | Thickness, mils | Porosity, % | MVTR, g/m²/day |
| 1a | 2:1 | 110 | 1.55 | 58.0 | 2,504 |
| 1b | 2:1 | 115.6 | 1.44 | 53.0 | 2,354 |
| 1c | 2:1 | 121.1 | 1.30 | 58.4 | 2,179 |
| 1d | 2.5:1 | 121.1 | 1.00 | 56.2 | 1,977 |
| 1e | 2.5:1 | 126.7 | 0.75 | 51.3 | 1,787 |

From the MVTR and porosity data summarized in Table II for films of Examples 1a-1e, it can been seen that as the stretching temperature is increased, the MVTR decreases. If the stretching temperature is too low; however, the film has a greater tendency to tear during drawing. The film that was formed could be stretched at 110° C. Breaks in the film only occurred when the film was attempted to be drawn at 104.4° C.

A qualitative analysis of the oriented porous film prepared by the extraction process from the composition of polypropylene homopolymer and ethylene-propylene block copolymer indicated that the film had a softer hand and feel to the touch and exhibited less noise when flexed compared to the films prepared from polypropylene homopolymer.

COMPARATIVE EXAMPLES A–G

Blends of various modifiers with a homopolymer polypropylene powder from Amoco Chemical Company having a nominal MFR of 3.2 dg/min were prepared. The modifier identifications, trade names, suppliers and characteristics were as follows:

| Identifier | Name | Supplier | Characteristics |
|---|---|---|---|
| Modifier-B | Kraton D-1102 | Shell | Triblock polystyrene copolymer having endblocks with unsaturated rubbery center block of polyisoprene or polybutadiene |
| Modifier-C | Kraton G-1901 | Shell | Triblock polystyrene copolymer having endblocks with saturated rubbery center block of ethylene/propylene or ethylene/butylene random copolymer |
| Modifier-D | Santoprene 201-55 | Monsanto | Blend of polypropylene with crosslinked ethylene/propylene/diene rubber (EPDM) |
| Modifier-E | Polybutene L-14 | Amoco | Low viscosity polybutene |
| Modifier-F | Polybutene H-300 | Amoco | High viscosity polybutene |

Homopolymer polypropylene pellets nucleated with Q-dye beta-spherulite nucleating agent and having a nominal MFR of 3.2 dg/min were mixed with 20 wt % of the modifier and repelletized in the Brabender as described in Example 1. For Comparative Examples containing Modifier-E and Modifier-F, blends were made containing 10 wt % of Modifier-E and 8 wt % of Modifier-F.

Comparative Example A was prepared from 50 wt % polypropylene, 50 wt % ethylene-propylene block copolymer and a final nucleant concentration of about 2.0 ppm of Q-dye using the procedure of Example 1.

Comparative Example B was prepared from 25 wt % polypropylene, 75 wt % ethylene-propylene block copolymer and a final nucleant concentration of about 2.0 ppm of Q-dye using the procedure of Example 1.

Comparative Example C was prepared from 80 wt % polypropylene, 20 wt % Modifier-B and 1.5 ppm of Q-dye using the procedure of Example 1.

Comparative Example D was prepared from 80 wt % polypropylene, 20 wt % of Modifier-C and 1.5 ppm of Q-dye using the procedure of Example 1.

Comparative Example E was prepared from 80 wt % polypropylene, 20 wt % Modifier-D and 1.5 ppm of Q-dye using the procedure of Example 1.

Comparative Example F was prepared from 90 wt % polypropylene, 10 wt % Modifier-E and 1.5 ppm of Q-dye using the procedure of Example 1.

Comparative Example G was prepared from 92 wt % polypropylene, 8 wt % of Modifier-F and 1.5 ppm of Q-dye using the procedure of Example 1.

The crystallization temperature, Tc, as well as the empirical parameter "K", which is a measure of the beta crystallinity of the polymeric composition measured by X-ray diffraction analysis for Comparative Examples C, D, E, F and G are summarized in Table III.

TABLE III

| | THERMAL DATA | |
|---|---|---|
| Comparative Samples | Tc. °C. | K |
| C | 116.7 | 0.07 |
| D | 118.2 | 0.18 |
| E | 113.8 | 0.16 |
| F | 118.0 | 0.18 |
| G | 119.1 | 0.22 |

With respect to the thermal data and K values presented in Table III, the crystallization temperature, Tc, has been the best predictor of beta-spherulite nucleation efficiency with the Tc generally rising monotonically with nucleant concentration. The beta-spherulite content of the cast film, as measured by the K value, generally increases as the nucleant concentration increases from 1 to 4 ppm. For polypropylene homopolymer, Tc is typically about 117.4° C. and K values depending on casting conditions of the film are typically in the range of 0.3 to 0.6.

From the thermal data presented in Table III, it can be seen that some modifiers appear to adversely affect the efficiency of beta-spherulite nucleation. This effect was particularly evident for Modifier-B in Comparative Example C and for Modifier-D in Comparative Example E in which the value of the Tc was depressed. The cast films made from these blends also had the lowest K values. The highest K value of 0.28 was for Example 1 as given in Table I. When film from this blend was extracted in toluene of 90° C., a good quality, uniform white and opaque porous film was obtained having a porosity of 17 to 20%. Extracted films of Comparative Examples D, F and G had poor appearance with very little whiteness indicating a low level of porosity.

For Example 1 it was apparent that immersion of the cast film in hot toluene did not extract the ethylene-propylene copolymer along with the beta-spherulites because the extracted film had an extraction level and film appearance consistent with the beta-spherulite content of the film. However, for Comparative Examples A and B with concentrations of 50 and 75 wt % ethylene-propylene block copolymer, the hot toluene treatment appeared to remove the ethylene-propylene block copolymer without imparting porosity to the films. Film made from the compositions of Comparative Examples A and B when immersed in hot toluene swelled much more than polypropylene homopolymer film and took longer to dry. A detailed microscopic examination of these films before extraction suggested that the ethylene-rich phase was dispersed throughout the film and was also present within the beta-spherulites. The ethylene-rich phase was not extracted and its presence as a solvent swollen polymer within the newly-created pores of the film may have caused these pores to close up during the drying process. Good quality porous films were not obtained from the films of Comparative Examples A and B.

Polymeric compositions of ethylene-propylene block copolymer (Modifier-A), a nominal 3 MFR polypropylene homopolymer resin and 1.65 ppm of Q-dye beta-spherulite nucleant were prepared with 20 wt % Modifier-A (Example 1f), 25 wt % Modifier-A (Example 1g) and 30 wt % Modifier-A (Example 1h). These compositions were pelletized on a 44.5 mm Prodex extruder, and then cast into film using a 38 mm Davis Standard extruder. The extruder was fitted with a 30.5 cm wide slit die, and the cast film produced was 26.7 cm wide and 4 mils thick. The chill roll temperature was in the range of 104.4° to 110° C., and the extruder screw speed was in the range of 15-30 rpm. Films made under various processing conditions were characterized by x-ray for K values. Samples of the film were also extracted by constraining them in an embroidery hoop and immersing the hoop in a toluene bath at 90.5° C. for 44 minutes. The weight loss after extraction and the MVTR of the extracted film were measured. The data for films made from blends of polypropylene and 20 wt %, 25 wt % and 30 wt % ethylene-propylene block copolymer are summarized in Table IV.

TABLE IV

| Example | Extruder RPM | Chill Roll Temp. °C. | K Value | Wt % Extracted | MVTR g/m²/24 hr |
|---------|--------------|----------------------|---------|----------------|-----------------|
| 1f | 20 | 107.2 | 0.52 | 24.3 | 265 |
| 1f | 20 | 107.2 | 0.55 | 23.3 | 430 |
| 1f | 25 | 107.2 | 0.53 | 25.3 | 453 |
| 1f | 25 | 104.4 | 0.55 | 25.1 | 327 |
| 1f | 25 | 104.4 | 0.56 | 27.1 | 579 |
| 1f | 25 | 110 | 0.64 | 30.7 | 836 |
| 1f | 30 | 107.2 | 0.64 | 31.0 | 515 |
| 1g | 15 | 107.2 | 0.46 | 23.7 | 39 |
| 1g | 20 | 107.2 | 0.64 | 29.9 | 547 |
| 1g | 25 | 107.2 | 0.69 | 35.6 | 659 |
| 1h | 15 | 107.2 | 0.50 | 26.5 | 18 |
| 1h | 15 | 107.2 | 0.57 | 26.7 | 33 |
| 1h | 20 | 107.2 | 0.60 | 33.7 | 325 |
| 1h | 20 | 104.4 | 0.55 | 29.7 | 132 |
| 1h | 20 | 110 | 0.62 | 34.0 | 124 |
| 1h | 25 | 107.2 | 0.68 | 33.4 | 113 |

From these data, it can be seen that for each of the compositions, the K value and the amount of polymer extracted measured in wt % increased with increasing chill roll temperature and/or increasing screw rpm as determined by an increase in the beta crystallinity content of the film. The MVTR generally increased with screw rpm and/or chill roll temperature for both the 20 wt % and 25 wt % blends, but not for the 30 wt % blend. The 30 wt % copolymer blend films generally had much lower MVTR values than that of the 20 wt % and 25 wt % blends in spite of the fact that the 30 wt % copolymer films had relatively high levels of extracted material.

This effect may be explained in that at copolymer levels above 30 wt %, the film becomes weakened by exposure to hot solvent and removal of greater amounts of polymer, and this weakness causes more of the pores and voids created by the extraction process to collapse when the film dries. Additional support for this explanation comes from the fact that the 30 wt % copolymer films showed a greater degree of sagging and swelling just after they were removed from the solvent, relative to the lower copolymer-containing films. Also, after being dried, the films containing 30 wt % copolymer were not as opaque and white as the 20 wt % and 25 wt % copolymer films, each having a higher MVTR. This lack of opacity is indicative of a lower concentration of microvoids.

These results suggest that in order to obtain oriented extracted films with high breathability from nucleated blends containing ethylene-propylene block copolymer, the concentration of the ethylene-propylene block copolymer used should be no greater than 30 wt % or 30 parts by weight based on the weight of polypropylene and block copolymer.

EXAMPLES 2-4 AND COMPARATIVE EXAMPLE H

Films of Examples 2-4 and Comparative Example H were prepared from compositions containing ethylene-propylene block copolymer containing 40 wt % ethylene with a melt flow rate of 1.0 dg/min (Himont, Hifax RA-061), polypropylene homopolymer having a MFR of 3.0 dg/min (Amoco Chemical Co., 6300 P) and/or low molecular weight polypropylene (Polyvisions Inc., Proflow-1000) having a melt viscosity of 137 poise measured at a shear rate of 136 sec$^{-1}$ and 190° C.

EXAMPLE 2

The oriented microporous film of Example 2 was prepared from a composition of 75 wt % of the ethylene-propylene block copolymer, 15 wt % of the polypropylene and 10 wt % of low molecular weight polypropylene. The composition was melt compounded using a 19 mm Brabender extruder at a polymer melt temperature of 205° C. and an extruder screw speed of 90 rpm and cast into a film using a 19 mm Brabender extruder with a 15.25-cm wide slit film die with polymer melt temperatures of 215° to 222° C., extruder screw speed of 50 rpm and chill roll temperatures of 89° to 92° C. The film was uniaxially stretched on an Instron Tensile Tester at room temperature using a 3:1 draw ratio. A modified test for measuring MVTR was used wherein the center portion of the stretched film was cut out, and because the center-portion sample was too small to be tested for MVTR using the standard 7.62 cm diameter test specimen, the center-portion sample was mounted on a 7.62 cm diameter foil mask and a 2.54 cm diameter sample test area was tested using standard desiccant cups. In order to compare the MVTR data from the modified test procedure with the MVTR data obtained on conventional-sized samples, several oriented porous film samples covering a wide range of MVTR values and using both conventional-sized, 7.62 cm diameter samples and foilmasked, 2.54 cm diameter samples were tested and a correlation equation was determined. The experimental MVTR data was approximately linear on a log-log plot over two decades of MVTR measurements and a least-squares regression analysis for films having MVTR values greater than 200 g/m²/24 hr yielded the following equation:

$$\log(MVTR \text{ of } 7.62\text{-cm disk}) = 0.3535 + 0.8519 \times (\log (MVTR \text{ of } 2.54\text{-cm disk}))$$

The MVTR determined by the modified MVTR test for a microporous film of Example 2 oriented 1 hr after casting was 8,420 g/m²/24 hr. For a film of Example 2 oriented at the same orientation conditions after being aged for several weeks, a MVTR value of 4,850 g/m²/24 hr was determined by the modified test procedure.

EXAMPLE 3

The microporous film of Example 3 was prepared using the composition and processing conditions of Example 2 with the exception that the cast film was stretched biaxially on a T. M. Long Stretcher at a draw ratio of 2:1 in each direction.

EXAMPLE 4

The oriented film of Example 4 was prepared from a composition of 87.5 wt % of the ethylene-propylene block copolymer, 7.5 wt % of the polypropylene homopolymer, and 5 wt % of low molecular weight polypropylene. The casting and orientating conditions were the same as in Example 2. The MVTR measured by the modified MVTR procedure was 3,310 g/m$^2$/24 hr.

COMPARATIVE EXAMPLE H

The oriented film of Comparative Example H was prepared from a composition of 75 wt % of the ethylene-propylene block copolymer and 25 wt % of polypropylene. The casting and orientating conditions were the same as in Example 2. A MVTR of 125 g/m$^2$/24 hr was determined by the modified MVTR procedure for the film prepared from a composition having no low molecular weight polypropylene component.

Compositions, film thicknesses and MVTR, as measured by the modified MVTR procedure, of the oriented films are summarized in Table V:

TABLE V

| | Composition, wt % | | | Thickness mils | Orientation Type, Ratio | MVTR, g/m$^2$/24 hr |
|---|---|---|---|---|---|---|
| | P-1[a] | P-2[b] | P-3[c] | | | |
| Example | | | | | | |
| 2 | 75 | 15 | 10 | 3 | Uniaxial, 3:1 | 8,420 |
| 3 | 75 | 15 | 10 | 3.25 | Biaxial, 2:1 | 7,635 |
| 4 | 87.5 | 7.5 | 5 | 3 | Uniaxial, 3:1 | 3,310 |
| Comparative Example | | | | | | |
| H | 75 | 25 | 0 | 3 | Uniaxial, 3:1 | 125 |

[a]P-1 - Ethylene-propylene block copolymer
[b]P-2 - Polypropylene homopolymer
[c]P-3 - Low molecular weight polypropylene The oriented microporous films of Examples 2-4 with uniaxial orientation at a 3:1 stretch ratio and biaxial orientation at a 2:1 stretch ratio prepared from compositions of 75 to 87.5 wt % ethylene-propylene block copolymer, 7.5 to 15 wt % polypropylene homopolymer and 5 to 10 wt % low molecular weight polypropylene exhibited excellent breathability with a range of 3,310 to 8,420 g/m$^2$/24 hr for MVTR. The film of Comparative Example H prepared from a composition having substantially no low molecular weight polypropylene had a very low MVTR of 125 g/m$^2$/24 hr.

EXAMPLES 5 AND 6 AND COMPARATIVE EXAMPLES I-K

Films of Examples 5 and 6 and Comparative Examples I to K were prepared from compositions of ethylene-propylene block copolymer containing 40 wt % ethylene with a MFR of 1.0 dg/min (Himont, Hifax RA-061), polypropylene homopolymer having a MFR of 3.0 dg/min (Amoco Chemical Co., 6300 P) and/or low molecular weight polypropylene (Polyvisions Inc., Proflow-1000) having a melt viscosity of 137 poise measured at a shear rate of 136 sec$^{-1}$ and 190° C.

EXAMPLE 5

The oriented microporous film of Example 5 was prepared from a composition of 75 wt % of the ethylene-propylene block copolymer, 15 wt % of the polypropylene homopolymer, and 10 wt % of low molecular weight polypropylene. The composition was melt compounded in a 19 mm Brabender extruder with a polymer melt temperature of 209° C. and an extruder screw speed of 100 rpm and formed into a film using a 19 mm Brabender extruder with a 15.25 cm wide slit-film die. The extrusion conditions included a polymer melt temperature of 219° C., an extruder screw speed of 50 rpm, extruded film speed of 15 fpm and chill roll temperatures of 86° to 89° C. The film was stretched on an Instron Tensile Tester at room temperature using a 3:1 draw ratio. The MVTR was measured on 2.54 cm diameter samples and calculated for the standard 7.62 cm diameter sample by the modified test procedure described in Example 2.

EXAMPLE 6

The oriented microporous film of Example 6 was prepared using the composition and processing conditions of Example 5 with the exception that 70 wt % of the ethylene-propylene block copolymer and 5 wt % of an ethylene-propylene impact modifier (Exxon, PA-30) were used instead of the 75 wt % ethylene-propylene block copolymer used in Example 5.

COMPARATIVE EXAMPLE I

The oriented film of Comparative Example I was prepared from a composition of 87.5 wt % of the ethylene-propylene block copolymer and 12.5 wt % of low molecular weight polypropylene. The composition was melt compounded using a 19 mm Brabender extruder at a polymer melt temperature of 205° C. and an extruder screw speed of 90 rpm and cast into a film using a 19 mm Brabender extruder with a 15.25 cm wide slit film die with polymer melt temperatures of 215° to 222° C., extruder screw speed of 50 rpm and chill roll temperatures of 89° to 92° C. The film was uniaxially stretched on an Instron Tensile Tester at room temperature using a 3:1 draw ratio. The modified test method for measuring MVTR was used.

COMPARATIVE EXAMPLE J

The oriented film of Comparative Example J was prepared from a composition of 90 wt % of the ethylene-propylene block copolymer and 10 wt % of low molecular weight polypropylene and the processing conditions of Example 5. A MVTR of 430 g/m$^2$/24 hr was measured by the modified MVTR test procedure.

COMPARATIVE EXAMPLE K

The oriented film of Comparative Example K was prepared from a blend composition of 75 wt % of the ethylene-propylene block copolymer, 22.5 wt % of the crystalline polypropylene, and 2.5 wt % of low molecular weight polypropylene and the processing conditions of Example 5. A MVTR of 93 g/m$^2$/24 hr was measured by the modified MVTR test procedure.

The films of Examples 5 and 6 and Comparative Examples I-K demonstrate that for consistent production of highly breathable microporous film and for microporous films having MVTR values of 500 g/m$^2$/24 hr or greater without the use of an extraction step, ethylene-propylene block copolymer, polypropylene homopolymer and low molecular weight polypropylene should all be present. Comparative Examples I and J demonstrate that highly breathable oriented microporous film cannot be consistently achieved in the absence of the polypropylene homopolymer component with Comparative Example I having a measured MVTR of 3,310 g/m$^2$/24 hr and Comparative Example J having a measured MVTR of 430 g/m$^2$/24 hr.

Data for films of Examples 5 and 6 and Comparative Examples I-K with compositions, film thicknesses and MVTR, measured by the modified MVTR test procedure on a 2.54 cm diameter sample of film and calculated for a 7.62 cm diameter sample from the correlation equation described in Example 2, are summarized in Table VI.

TABLE VI

|  | Composition, Wt. % | | | Film Thickness, mils | MVTR, g/m²/24 hr | |
|---|---|---|---|---|---|---|
|  | P-1[a] | P-2[b] | P-3[c] |  | Measured 2.54 cm disk | Calculated 7.62 cm disk |
| Example |  |  |  |  |  |  |
| 5 | 75 | 15 | 10 | 2.45 | 2,440 | 1,734 |
| 6[d] | 70 | 15 | 10 | 2.35 | 3,368 | 2,282 |
| Comparative Example |  |  |  |  |  |  |
| I | 87.5 | 0 | 12.5 | 3.00 | 3,310 | 2,242 |
| J | 90 | 0 | 10 | 2.80 | 430 | 395 |
| K | 75 | 22.5 | 2.5 | 2.27 | 93 | 207 |

[a]P-1 - Ethylene-propylene block copolymer
[b]P-2 - Polypropylene homopolymer
[c]P-3 - Low molecular weight polypropylene
[d]Contains 5 wt % of an ethylene-propylene impact modifier

EXAMPLES 7 AND 8 AND COMPARATIVE EXAMPLE L

Films of Examples 7 and 8 and Comparative Example L were prepared from compositions of an ethylene-propylene block copolymer containing 40 wt % ethylene (Himont, Hifax RA-061) having a MFR of 1.0 dg/min, a crystalline isotactic polypropylene having a MFR of 3.0 dg/min (Amoco Chemical Co., 6300 P) and/or a low molecular weight polypropylene (Polyvisions Inc., Proflow-1000) having a melt viscosity of 137 poise measured at a shear rate of 136 sec$^{-1}$ and 190° C.

EXAMPLE 7

The oriented microporous film of Example 7 was prepared from a composition of 70 wt % of the ethylene-propylene block copolymer, 15 wt % of polypropylene homopolymer, 10 wt % of low molecular weight polypropylene and 5 wt % of polybutene (Amoco Chemical Co., H-300). The polymer composition was melt compounded in a 19 mm Brabender extruder with a polymer melt temperature of 209° C. and an extruder screw speed of 100 rpm and was cast into a film with a 19 mm Brabender extruder using a 30.5 cm wide slit film die. The film extrusion process conditions included a polymer melt temperature of 219° C., an extruder screw speed of 50 rpm, extruded film speed of 15 fpm and chill roll temperatures of 86° to 89° C. The film was biaxially stretched on a T. M. Long Stretcher using a 2:1 stretch ratio with Example 7a at a temperature of 65.6° C., Example 7b at a temperature of 62.8° C. and Example 7c at a temperature of 60° C.

EXAMPLE 8

The microporous film of Example 8 was prepared using a composition of 50 wt % of the ethylene-propylene block copolymer, 40 wt % of the polypropylene homopolymer, and 10 wt % of low molecular weight polypropylene, and processing conditions as in Example 7 with Example 8a oriented at a temperature of 65.6° C., Example 8b oriented at a temperature of 62.8° C. and Examples 8c and 8d oriented at a temperature of 60° C.

COMPARATIVE EXAMPLE L

The oriented film of Comparative Example L was prepared from a composition of 75 wt % of the ethylene-propylene block copolymer, 22.5 wt % of the polypropylene homopolymer, and 2.5 wt % of low molecular weight polypropylene. The casting and orientating conditions were the same as in Example 7.

In both Examples 7 and 8, the MVTR increased as the stretch temperature was decreased. For Comparative Example L, wherein a film was prepared from a composition having 2.5 wt % of low molecular weight polypropylene, the measured MVTR values was 41 g/m²/24 hr.

The compositions, thicknesses and maximum MVTRs as measured on a 7.62 cm diameter sample of film for films of Examples 7 and 8 and Comparative Example L are summarized in Table VII.

EXAMPLES 9 AND 10

Films of Examples 9a, 9b, 10a, and 10b were prepared from compositions of an ethylene-propylene block copolymer containing 40 wt % ethylene with a MFR of 1.0 dg/min (Himont, Hifax RA-061), a polypropylene homopolymer having a MFR of 3.0 dg/min (Amoco Chemical Co., 6300 P) and a low molecular weight polypropylene (Polyvisions Inc., Proflow-1000) having a melt viscosity of 137 poise measured at a shear rate of 136 sec$^{-1}$ and 190° C.

EXAMPLE 9a

The oriented film of Example 9a was prepared from a composition of 50 wt % of the ethylene-propylene block copolymer, 35 wt % of the polypropylene homopolymer, and 15 wt % of the low molecular weight polypropylene with 2 ppm of a red quinacridone dye (Hoechst-Celanese, E3B) as a beta-spherulite nucleating agent. The composition was melt compounded in a 19-mm Brabender extruder at a polymer melt temperature of 205° C. and an extruder screw speed of 100 rpm. The composition was cast into film with a 19 mm Brabender extruder using a 15.25 cm wide slit film die at polymer melt temperatures of 220° to 243.5° C., extruder screw speeds of 50 or 70 rpm and chill roll temperatures of 81° to 100° C. The films were stretched biaxially on a T. M. Long Stretcher using a stretch ratio of 2:1 at a temperature of 140° C.

EXAMPLE 9b

The oriented film of Example 9b was prepared from the same composition and processing conditions as Example 9a with the exception that no beta-spherulite nucleating agent was used and the polymer melt temperatures were 220° to 241° C. and the chill roll temperatures of 82° to 100° C.

EXAMPLE 10a

The oriented film of Example 10a was prepared from a composition of 70 wt % of the ethylene-propylene block copolymer, 20 wt % of polypropylene homopolymer, and 10 wt % of low molecular weight polypropylene with 2 ppm of the red quinacridone dye. The processing conditions were the same as in Example 9a with the exception that the polymer melt temperature were of 220° to 241° C.

EXAMPLE 10b

The oriented film of Example 10b was prepared with the same composition and process conditions as Example 10a with the exception that no beta-spherulite nucleating agent was used.

Beta-spherulite nucleant concentration, polymer processing conditions and oriented film properties including a color designation rating wherein C1 denotes the least white film and C4 denotes the whitest film, a tear designation indicating the tendency of the film to tear during orientation, a measured MVTR value and a calculated MVTR value determined as described in Example 2 are tabulated in Table VIII.

In terms of film appearance it was observed that at higher chill roll temperatures, the use of the beta-spherulite nucleating agent and the use of the film prepared from compositions containing lower ethylene-propylene block copolymer concentrations produced better appearance and more uniform films. There was a higher tendency for the film to tear during stretching at the higher chill roll temperatures. The microporous films prepared from compositions containing the beta-spherulite nucleating agent exhibited MVTRs which were 52% higher than the film prepared from compositions containing no beta-spherulite nucleant.

TABLE VII

| | Composition, Wt. % | | | Orientation Conditions[e] | | Film Properties | | |
|---|---|---|---|---|---|---|---|---|
| | P-1[a] | P-2[b] | P-3[c] | Temp. °C. | Relative Speed | Thickness, mils | Porosity, % | MVTR g/m$^2$/24 hr |
| Example | | | | | | | | |
| 7a[d] | 70 | 15 | 10 | 65.6 | 9 | 1.95 | 45.9 | 2,296 |
| 7b[d] | 70 | 15 | 10 | 62.8 | 9 | 1.90 | 42.3 | 2,438 |
| 7c[d] | 70 | 15 | 10 | 60 | 9 | 2.05 | 43.7 | 2,951 |
| 8a | 50 | 40 | 10 | 65.6 | 9 | 2.35 | 58.2 | 621 |
| 8b | 50 | 40 | 10 | 62.8 | 9 | 2.10 | 55.2 | 632 |
| 8c | 50 | 40 | 10 | 60 | 9 | 2.15 | 56.3 | 1,030 |
| 8d | 50 | 40 | 10 | 60 | 9 | 2.05 | 51.3 | 975 |
| Comparative Example | | | | | | | | |
| Comp. L, | 75 | 22.5 | 2.5 | 60 | 7 | 1.70 | 35.5 | 41 |

[a]P-1 - Ethylene-propylene block copolymer
[b]P-2 - Polypropylene homopolymer
[c]P-3 - Low molecular weight polypropylene
[d]Contains 5 wt % of polybutene
[e]Films were oriented 2:1 in the MD and TD simultaneously. Relative speed was a measure of the relative rate of stretching with a larger number indicating a higher rate of stretching.

TABLE VIII

| | | Polymer Processing Conditions | | | Film Properties | | | |
|---|---|---|---|---|---|---|---|---|
| | Nucleant | Chill Roll | Extruder | Polymer Melt | | | MVTR[b], g/m$^2$/24 hr | |
| Example[a] | Conc. ppm | Temp. °C. | rpm | Temp. °C. | color[c] | Tear[d] | Measured | Calculated |
| 9a | 2 | 91 | 70 | 243.5 | C1 | T2 | 1.693 | 3,182 |
| 9a | 2 | 100 | 70 | 220 | C1 | T0 | 1,962 | 1,847 |
| 9a | 2 | 99 | 50 | 240 | C1 | T0 | 2,207 | 1,995 |
| 9a | 2 | 82.5 | 70 | 241 | C1 | T0 | 1,360 | 1,705 |
| 9a | 2 | 81 | 50 | 221.5 | C2 | T0 | 220 | 233 |
| 10a | 2 | 90 | 50 | 221.5 | C2 | T1 | 739 | 596 |
| 10a | 2 | 100 | 50 | 221 | C1 | T2 | ST | 247 |
| 10a | 2 | 99 | 70 | 220 | C1 | T2 | ST | 1,940 |
| 10a | 2 | 99 | 70 | 240 | C1 | T2 | 2,849 | 1,345 |
| 10a | 2 | 83 | 70 | 222 | C2 | T1 | 319 | 347 |
| 10a | 2 | 81 | 50 | 241 | C3 | T0 | 143 | 163 |
| 9b | 0 | 90 | 50 | 241 | C1 | T0 | 859 | 771 |
| 9b | 0 | 92 | 70 | 221.5 | C1 | T0 | 1,264 | 950 |
| 9b | 0 | 100 | 50 | 221 | C4 | T4 | ST | 143 |
| 9b | 0 | 99 | 70 | 240 | C2 | T0 | 555 | 779 |
| 9b | 0 | 82 | 70 | 241 | C2 | T0 | 1,489 | 915 |
| 9b | 0 | 82 | 70 | 222 | C2 | T0 | 176 | 153 |
| 9b | 0 | 82 | 50 | 240.5 | C2 | T0 | 189 | 130 |
| 10b | 0 | 91 | 70 | 241 | C1 | T2 | 2,023 | 1,691 |
| 10b | 0 | 100 | 50 | 220 | C2 | T3 | ST | 129 |
| 10b | 0 | 99 | 70 | 221 | C2 | T3 | ST | 1,103 |
| 10b | 0 | 99 | 70 | 239 | C3 | T3 | 426 | 793 |
| 10b | 0 | 82 | 70 | 241 | C2 | T2 | ST | 915 |
| 10b | 0 | 83 | 50 | 221.5 | C4 | T1 | 103 | 191 |

[a]Example 9a had a 50/35/15 weight ratio of ethylene-propylene block copolymer with 40 wt % ethylene, polypropylene with a MFR of 3.0 dg/min and low molecular weight polypropylene with 2 ppm of a red quinacridone dye (Q-dye), Example 9b had a 50/35/15 weight ratio with no Q-dye, Example 10a had a weight ratio of 70/20/10 with 2 ppm of Q-dye and Example 10b had a 70/20/10 weight ratio with no Q-dye.
[b]MVTR measured on films stretched biaxially on the T.M. Long Stretcher at 60° C. using a 2:1 draw ratio. ST - film samples toe and no MVTR value was obtained.
[c]The color designation indicates the relative whiteness of the stretched film with C1 indicating the least white film and C4 the whitest film.
[d]The tear designation indicates the tendency of the film to tear during stretching with T0 indicating no tearing, T1 a slight tear, T2 a moderate tear, T3 a major tear, and T4 a film that almost disintegrated during stretching.

EXAMPLES 11-13

Films of Examples 11a, 11b, 12a, 12b, 12c and 13 were prepared from compositions of ethylene-propylene block copolymer containing 40 wt % ethylene (Himont, Hifax RA-061) and having a MFR of 1.0 dg/min, polypropylene homopolymer having a MFR of 3.0 dg/min (Amoco Chemical Co., 6300 P) and low molecular weight polypropylene (Polyvisions Inc., Proflow-1000) having a melt viscosity of 137 poise measured at a shear rate of 136 sec$^{-1}$ and 190° C. A masterbatch of polypropylene and calcium carbonate (PP/CaCO$_3$), PF-85F available from A. Schulman Co. having a MFR of about 6 to 8 and 40 wt % of CaCO$_3$ having a mean particle size of 0.8 microns, was used to incorporate CaCO$_3$ into Examples 12 and 13.

EXAMPLE 11a

The oriented film of Example 11a was prepared from a composition of 50 wt % of the ethylene-propylene block copolymer, 35 wt % polypropylene homopolymer, and 15 wt % low molecular weight polypropylene with 2 ppm of red quinacridone dye (Hoechst-Celanese, E3B) beta-spherulite nucleating agent. The composition was compounded with a 63.5 mm Prodex extruder and cast into a film from a 61 cm wide die having a die lip gap of 10 mils onto a heated chill roll with a surface temperature of 110° C. The cast film thickness was about 4.5 to 5 mils, and the extruder speed was set at 48 to 50 rpm, which corresponded to an output rate of about 25 kg/hr. The cast film line speed was about 0.125 m/s, and the MD orientation draw ratio was 2:1. The film width at the MD inlet and outlet was 50.8 cm and 48.3 cm, respectively. The MD stretching was done at 60° C. with the annealing section was set at 71° C. The TD stretching on a Tenter Frame was done at draw ratios of 2:1 to 3:1 and temperatures of 105° to 120° C. The highest temperature experienced by the film was in the last zone, the annealing zone, of the Tenter Frame oven. In this last zone the track separation was brought in by 10 to 15 cm in order to allow some relaxation of the film. The film line speed in the TD section was 0.75 m/s. At four equally spaced locations across the width of the film, samples designated as Examples 11a-1, 11a-2, 11a-3 and 11a-4 were obtained and tested for thickness, porosity (at an assumed polymer resin density of 0.905 g/cm$^3$) and MVTR measured at a shortened time interval of 4 hours and at the standard time interval of 20 hours.

EXAMPLE 11b

The oriented film of Example 11b was prepared from the composition and processing conditions used for Example 11a. At four locations equally spaced across the width of the film, Examples designated as Examples 11b-1, 11b-2, 11b-3, and 11b-4 were obtained and tested for properties as in Example 11a.

EXAMPLE 12a

The oriented film of Example 12a was prepared from a composition of 50 wt % of the ethylene-propylene block copolymer, 35 wt % of the PP/CaCO$_3$ masterbatch to achieve a 14 wt % calcium carbonate concentration in the composition and 15 wt % low molecular weight polypropylene with 2 ppm of red quinacridone dye. The processing conditions were the same as for Example 11a. At four locations equally spaced across the width of the film, Examples designated as Examples 12a-1, 12a-2, 12a-3, and 12a-4 were obtained and tested for properties as in Example 11a.

EXAMPLE 12b

The oriented film of Example 12b was prepared from composition and processing conditions the same as for Example 12a. At four locations equally spaced across the width of the film, Examples designated as Examples 12b-1, 12b-2, 12b-3, and 12b-4 were obtained and tested for properties as in Example 11a.

EXAMPLE 12c

The oriented film of Example 12c was prepared from composition and processing conditions the same as for Example 12a. At four locations equally spaced across the width of the film, Examples designated as Examples 11b-1, 11b-2, 11b-3, and 11b-4 were obtained and tested for properties as in Example 11a.

EXAMPLE 13

The oriented film of Example 13 was prepared from a composition of 70 wt % of the ethylene-propylene block copolymer, 20 wt % of the PP/CaCO$_3$ masterbatch to achieve a CaCO$_3$ concentration of 8 wt % in the composition and 10 wt % low molecular weight polypropylene with 2 ppm of red quinacridone dye. The processing conditions were the same as for Example 11a. At four locations equally spaced across the width of the film, Examples designated as Examples 13-1, 13-2, 13-3 and 13-4 were obtained and tested for properties as in Example 11a.

Examples 11a and 11b illustrate microporous films prepared from compositions comprising ethylene-propylene block copolymer, polypropylene homopolymer, low molecular weight polypropylene and a beta-spherulite nucleating agent with an average value for the 4-hr MVTR for eight samples of 3,645 g/m$^2$/24 hr. Examples 12a, 12b and 12c illustrate that with the addition of both a beta-spherulite nucleating agent and 14 wt % CaCO$_3$ higher 4-hr MVTR values are obtained with an average of 6,195 g/m$^2$/24 hr for 12 samples. Example 13 illustrates that excellent MVTR values are obtained with higher ethylene-propylene block copolymer content and 8 wt % CaCO$_3$ with an average 4-hr MVTR value of 5,635 g/m$^2$/24 hr for four samples.

Properties including thickness, porosity and MVTR measured at a shortened time interval of 4 hours and at the standard internal of 20 hours determined for these films are summarized in Table IX.

EXAMPLES 14-16

Oriented films of Examples 14-16 were prepared from compositions of ethylene-propylene copolymer, a masterbatch of polypropylene and calcium carbonate, and low molecular weight polypropylenes at two different concentration levels and three different viscosity levels. The ethylene-propylene block copolymer was Hifax RA-061 from Himont and had an MFR of about 1.0 and an ethylene content of 40 wt %. The masterbatch of PP/CaCO$_3$ was PF-85F available from A. Schulman Co. containing 40 wt % of CaCO$_3$ with a mean particle size of 0.8 microns and had a MFR of 6 to 8. The low molecular weight polypropylenes were Proflow resins obtained from Polyvisions Inc. having melt viscosities of 76 to 346 poise measured at 136 sec$^{-1}$ and 190° C. All of the compositions contained 2 ppm of red quinacridone dye as a beta-spherulite nucleant, together with 0.18 wt %, based on the weight of the polymer components, of a stabilizer package comprising antioxidants and processing aids.

EXAMPLE 14a

The oriented film of Example 14a was prepared from a composition of 50 wt % of the ethylene-propylene copolymer, 35 wt % of the PP/CaCO$_3$ masterbatch and 15 wt % of a low molecular weight polypropylene having a melt viscosity of 346 poise measured at a shear rate of 136 sec$^{-1}$ and 190° C. The composition was compounded with either a 44.5 mm Prodex extruder or a 19 mm Brabender extruder and then pelletized. Film was cast from either a 38 mm Davis Standard extruder with a 30.5 cm slit die or a 19 mm Brabender extruder with a 15.2 cm slit die at melt temperatures of 200° and 238° C. Films made with the 38 mm Davis Standard extruder were cast onto a heated chill roll with a 107° C. surface temperature and pinned to the roll with an air knife. For the 19 mm Brabender extruder a heated 3-roll stack was used without an air knife, and the center roll temperature was set at 90° C. The cast film thickness from film made by either extruder was about 4 to 5 mils. The films were stretched on the T. M. Long Stretcher at temperatures of 60° and 77° C., with a 2:1 stretch ratio in both directions.

TABLE IX

| | Film Properties | | | |
|---|---|---|---|---|
| Example | Thickness, mils | Porosity, % | 20 hr - MVTR g/m$^2$/24 hr | 4 hr - MVTR, g/m$^2$/24 hr |
| 11a-1 | 3.0 | 64.9 | 3,820 | 4,030 |
| 11a-2 | 3.1 | 61.9 | 4,300 | 4,680 |
| 11a-3 | 3.0 | 63.0 | 3,800 | 4,030 |
| 11a-4 | 2.6 | 65.1 | 5,000 | 4,920 |
| 11b-1 | 2.9 | 67.0 | 2,800 | 2,780 |
| 11b-2 | 2.7 | 61.2 | 3,130 | 3,160 |
| 11b-3 | 2.4 | 60.0 | 3,040 | 2,990 |
| 11b-4 | 2.5 | 61.4 | 2,610 | 2,570 |
| 12a-1 | 3.1 | 65.4 | 4,160 | 4,570 |
| 12a-2 | 2.5 | 65.1 | 5,210 | 6,330 |
| 12a-3 | 3.0 | 67.4 | 4,470 | 4,970 |
| 12a-4 | 2.5 | 67.9 | 5,590 | 6,940 |
| 12b-1 | 1.7 | 60.2 | 4,610 | 5,260 |
| 12b-2 | 2.8 | 66.2 | 5,600 | 7,020 |
| 12b-3 | 3.7 | 65.8 | 5,510 | 6,660 |
| 12b-4 | 3.0 | 64.5 | 6,170 | 8,200 |
| 12c-1 | 2.9 | 66.8 | 4,740 | 5,380 |
| 12c-2 | 3.3 | 65.2 | 4,720 | 5,830 |
| 12c-3 | 2.8 | 65.6 | 4,900 | 5,720 |
| 12c-4 | 1.8 | 61.3 | 5,870 | 7,490 |
| 13-1 | 2.2 | 59.8 | 4,450 | 5,010 |
| 13-2 | 2.8 | 58.9 | 4,980 | 5,800 |
| 13-3 | 2.7 | 59.2 | 5,060 | 5,960 |
| 13-4 | 1.9 | 62.2 | 4,920 | 5,760 |

EXAMPLE 14b

The oriented film of Example 14b was prepared from the same composition and processing conditions as Example 14a with the exception that the low molecular weight polypropylene had a melt viscosity of 138 poise measured at the same conditions.

EXAMPLE 14c

The oriented film of Example 14c was prepared from the same composition and processing conditions as Example 14a with the exception that the low molecular weight polypropylene had a melt viscosity of 107 poise measured at the same conditions.

EXAMPLE 15a

The oriented film of Example 15a was prepared from a composition of 50 wt % Hifax RA-061, 35 wt % PF-85F masterbatch, 6 wt % of 6200P polypropylene and 9 wt % of a low molecular weight polypropylene having a melt viscosity of 346 poise measured at the same conditions as in Example 14a. The processing conditions were the same as in Example 14a.

EXAMPLE 15b

The oriented film of Example 15b was prepared from the same composition as Example 15a with the exception that the low molecular weight polypropylene had a melt viscosity of 138 poise measured at the same conditions. The processing conditions were the same as in Example 14a.

EXAMPLE 15c

The oriented film of Example 15c was prepared from the same composition as Example 15a with the exception that the low molecular weight polypropylene had a melt viscosity of 107 poise measured at the same conditions as in Example 14a. The processing conditions were the same as for Example 14a.

EXAMPLE 16

The oriented film of Example 16 was prepared from a composition of 50 wt % Hifax RA-061, 35 wt % PF-85F masterbatch and 15 wt % of a low molecular weight polypropylene having a melt viscosity of 138 poise measured at the same conditions as in Example 14a and was compounded in a Werner & Pfliederer ZSK-30 twin-screw extruder.

The biaxially stretched films of Examples 14–16 were tested for both MVTR and tensile properties. For tensile testing, five micro "T" bar specimens for ASTM Test Method D-1078 were cut from each film in either the MD or TD directions and tested on an Instron at a crosshead speed of 5.08 cm/min. An effective gauge length of 2.225 cm was used to calculate the percent elongation. The MVTR values obtained on these films after being biaxially stretched on the T. M. Long Stretcher are tabulated in Table X and range from about 4300 to 6300 g/m$^2$/24 hr. In comparing the MVTRs of films prepared from compositions containing 9 versus 15 wt % low molecular weight polypropylene, no apparent decrease in MVTR was observed for films prepared from blends with 15 wt % Proflow when the stretching temperature was increased from 60° to 77° C. At the 9 wt % Proflow level some decrease in MVTR with increasing stretch temperature was evident. Tensile properties in the transverse direction obtained on these biaxially stretched films at 77° C. are given in Table X. For film cast from 200° C. melt at either level of low molecular weight polypropylene (LMWPP), a definite reduction in both tensile strength and breaking elongation with a decrease in the melt viscosity of the Proflow used was observed. Films prepared from resins containing 9 wt % LMWPP had much higher tensile strength and elongation than those prepared from 15 wt % LMWPP containing compositions. The films prepared from compositions containing 9 wt % LMWPP had break elongations as high as 185% for a film that had already been biaxially stretched at a 2:1 draw ratio. For the films cast from 238° C. melt, the film prepared from the compositions containing 9 wt % LMWPP had much higher breaking elongations and tensile strengths than the 15 wt % LMWPP containing compositions, however, no trend of break elongation with LMWPP melt viscosity at the 9 wt % level was evident for these films. Also, the break elongations of these 9 wt % LMWPP films cast from 238° C. melt were lower than that of the films cast from 200° C. melt.

made at a temperature of 60° C. and the annealing section was set at 71° C. with some of the MD oriented film edge-trimmed before windup. Most of the TD orienta-

TABLE X

| | | Tensile and MVTR Properties | | | | | | |
|---|---|---|---|---|---|---|---|---|
| | | Low Molecular Weight PP Melt Viscosity and Composition, Wt % | | | Transverse Tensile Properties | | MVTR, g/m$^2$24 hr | |
| Example | Melt Temp. °C. | 346 Poise | 138 Poise | 107 Poise | Tensile Stregnth, psi | Elongation @ Break, % | Stretching 60° C. | Temperature, 77° C. |
| 14-a | 200 | 15 | — | — | 1,389 | 82 | 6,013 | 6,251 |
| 14-a | 238 | 15 | — | — | NM | NM | NM | NM |
| 14-b | 200 | — | 15 | — | 1,271 | 77 | 5,173(b) | 5,729 |
| 14-b | 238 | — | 15 | — | 1,355 | 75 | 5,221(b) | 5,056 |
| 14-c | 200 | — | — | 15 | 1,167 | 63 | (c) | 6,302 |
| 14-c | 238 | — | — | 15 | 1,289 | 59 | (c) | 5,350 |
| 15-a | 200 | 9(a) | — | — | 1,640 | 185 | 5,687 | 4,676 |
| 15-a | 238 | 9(a) | — | — | 1,653 | 126 | 5,200 | 4,620 |
| 15-b | 200 | — | 9(a) | — | 1,591 | 158 | 5,281 | 4,903 |
| 15-b | 238 | — | 9(a) | — | 1,437 | 123 | 4,932 | 4,979 |
| 15-c | 200 | — | — | 9(a) | 1,412 | 131 | 7,313 | (b) |
| 15-c | 238 | — | — | 9(a) | 1,411 | 123 | 4,908 | 4,305 |
| 16 | 200 | — | 15 | — | 1,328 | 114 | 6,068 | 5,345 |
| 16 | 238 | — | 15 | — | 1,352 | 85 | 5,409 | 5,289 |

(a) Includes 6 wt % polypropylene homopolymer
(b) One of two samples tore
(c) Two of two samples tore
NM Not Measured

EXAMPLES 17-37 AND COMPARATIVE EXAMPLES M AND N

Except where stated otherwise, oriented films of Examples 17-37 were prepared from compositions of ethylene-propylene copolymer and isotactic polypropylene homopolymer with various concentrations of $CaCO_3$ and low molecular weight polypropylenes with various melt viscosities. The ethylene-propylene block copolymer had an ethylene content of 40 wt % and was Himont Hifax RA-061 resin with an MFR of about 1.0 dg/min. The polypropylene and $CaCO_3$ were from a PP/$CaCO_3$ masterbatch (PF-85F) available from A. Schulman Co. having a MFR of about 6 to 8 dg/min and which contained 40 wt % of a $CaCO_3$ having a mean particle size of 0.8 microns. If additional polypropylene homopolymer was required, Amoco Chemical Co. polypropylene homopolymer 6214 resin having a nominal MFR of about 1.8 to 2.7 was used. The low molecular weight polypropylenes were Proflow resins obtained from Polyvisions Inc. having melt viscosities of 74 to 346 poise measured at 136 sec$^{-1}$ and 190° C. All of the compositions contained 2 ppm of red quinacridone dye as a beta-spherulite nucleating agent.

EXAMPLE 17

The oriented film of Example 17 was prepared from a composition of 50 wt % of the ethylene-propylene block copolymer, 35 wt % of the PP/$CaCO_3$ masterbatch, 3 wt % of low molecular weight polypropylene having a melt viscosity of 346 poise measured at 136 sec$^{-1}$ and a temperature of 190° C., and 12 wt % of the polypropylene homopolymer. The composition was compounded with a 63.5 mm Prodex extruder, pelletized and cast into film from a 63.5 mm Prodex extruder having a 61 cm wide die having a die lip gap of 10 mils onto a heated chill roll with a surface temperature of 110° C. The cast film thickness was about 4.5 to 5 mils, and the extruder rpm was typically set at 48 to 50 for an output rate of about 25 kg/hr. The cast film line speed was 0.125 m/s and the MD orientation stretch ratio was 2:1. The film width at the MD inlet and outlet was 50.8 cm and 48.3 cm, respectively. The MD orientation was made at a temperature of 60° C. and the annealing section was set at 71° C. with some of the MD oriented film edge-trimmed before windup. Most of the TD orientation was at draw ratios of 2:1 to 3:1, and temperatures of 105° to 120° C. The highest temperature that the film experienced was in the last or annealing zone of the Tenter Frame oven wherein the track separation was reduced by 10 to 15 cm in order to allow some relaxation of the film. The film line speed in the TD orientation section was 0.75 m/s.

Examples 18-30 and Comparative Example M were prepared by the processing conditions described in Example 17.

EXAMPLE 18

The film of Example 18 was prepared from a composition of 50 wt % of the ethylene-propylene block copolymer, 47 wt % of the PP/$CaCO_3$ masterbatch for a $CaCO_3$ concentration of 18.8 wt %, and 3 wt % of low molecular weight polypropylene having a melt viscosity of 74 poise at 136 sec$^{-1}$ and 190° C.

EXAMPLE 19

The film of Example 19 was prepared from a composition of 60 wt % of the ethylene-propylene block copolymer, 37 wt % of the PP/$CaCO_3$ masterbatch for a $CaCO_3$ concentration of 14.8 wt %, and 3 wt % of low molecular weight polypropylene having a melt viscosity of 74 poise at 136 sec$^{-1}$ and 190° C.

EXAMPLE 20

The film of Example 20 was prepared from a composition of 50 wt % of the ethylene-propylene block copolymer, 35 wt % of the PP/$CaCO_3$ masterbatch for a $CaCO_3$ concentration of 14 wt %, 6 wt % of low molecular weight polypropylene having a melt viscosity of 112 poise at 136 sec$^{-1}$ and 190° C., and 9 wt % of the polypropylene homopolymer.

EXAMPLE 21

The film of Example 21 was prepared from a composition of 50 wt % of the ethylene-propylene block copolymer, 35 wt % of the PP/$CaCO_3$ masterbatch (PF-45F) having a lower MFR than PF-85F for a $CaCO_3$ concentration of 14 wt %, 6 wt % of low molecular weight polypropylene having a melt viscosity of 112 poise at 136 sec⁻¹ and 190° C., and 9 wt % of the polypropylene homopolymer.

EXAMPLE 22

The film of Example 22 was prepared from a composition of 50 wt % of the ethylene-propylene block copolymer, 35 wt % of the PP/CaCO$_3$ masterbatch for a CaCO$_3$ concentration of 14 wt %, 9 wt % of low molecular weight polypropylene having a melt viscosity of 346 poise at 136 sec⁻¹ and 190° C., and 6 wt % of the polypropylene homopolymer.

EXAMPLE 23

The film of Example 23 was prepared from a composition of 50 wt % of the ethylene-propylene block copolymer, 35 wt % of the PP/CaCO$_3$ masterbatch for a CaCO$_3$ concentration of 14 wt %, 3 wt % of low molecular weight polypropylene having a melt viscosity of 74 poise at 136 sec⁻¹ and 190° C., and 12 wt % of the polypropylene homopolymer.

EXAMPLE 24

The film of Example 24 was prepared from a composition of 50 wt % of the ethylene-propylene block copolymer, 35 wt % of the PP/CaCO$_3$ masterbatch for a CaCO$_3$ concentration of 14 wt %, 6 wt % of low molecular weight polypropylene having a melt viscosity of 346 poise at 136 sec⁻¹ and 190° C., and 9 wt % of the polypropylene homopolymer.

EXAMPLE 25

The film of Example 25 was prepared from a composition of 50 wt % of the ethylene-propylene block copolymer, 35 wt % of the PP/CaCO$_3$ masterbatch for a CaCO$_3$ concentration of 14 wt %, 9 wt % of low molecular weight polypropylene having a melt viscosity of 138 poise at 136 sec⁻¹ and 190° C., and 6 wt % of the polypropylene homopolymer.

EXAMPLE 26

The film of Example 26 was prepared from a composition of 50 wt % of the ethylene-propylene block copolymer, 35 wt % of the PP/CaCO$_3$ masterbatch for a CaCO$_3$ concentration of 14 wt %, 9 wt % of low molecular weight polypropylene having a melt viscosity of 112 poise at 136 sec⁻¹ and 190° C., and 6 wt % of the polypropylene homopolymer.

EXAMPLE 27

The film of Example 27 was prepared from a composition of 50 wt % of the ethylene-propylene block copolymer, 35 wt % of the PP/CaCO$_3$ masterbatch for a CaCO$_3$ concentration of 14 wt % and 15 wt % of low molecular weight polypropylene having a melt viscosity of 346 poise at 136 sec⁻¹ and 190° C.

EXAMPLE 28

The film of Example 28 was prepared from a composition of 50 wt % of the ethylene-propylene block copolymer, 35 wt % of the PP/CaCO$_3$ masterbatch for a CaCO$_3$ concentration of 14 wt %, 3 wt % of low molecular weight polypropylene having a melt viscosity of 74 poise at 136 sec⁻¹ and 190° C., 12 wt % of the polypropylene homopolymer and 600 ppm of Microban ®, an antimicrobial agent comprising 2,4,4'-trichloro-2'-hydroxyphenyl ether from Clinitex Corporation of Huntersville, N.C.

EXAMPLE 29

The film of Example 29 was prepared from a composition of 50 wt % of the ethylene-propylene block copolymer, 35 wt % of the PP/CaCO$_3$ masterbatch for a CaCO$_3$ concentration of 14 wt %, 3 wt % of low molecular weight polypropylene having a melt viscosity of 74 poise at 136 sec⁻¹ and 190° C., 12 wt % of the polypropylene homopolymer and 200 ppm of Microban ®.

EXAMPLE 30

The film of Example 30 was prepared from a composition of 49.5 wt % of the ethylene-propylene block copolymer, 37 wt % of the PP/CaCO$_3$ masterbatch for a CaCO$_3$ concentration of 14.8 wt %, 3 wt % of low molecular weight polypropylene having a melt viscosity of 74 poise at 136 sec⁻¹ and 190° C. and 10.5 wt % of mineral oil.

COMPARATIVE EXAMPLE M

The film of Comparative Example M was prepared from a composition of 50 wt % of the ethylene-propylene block copolymer, 35 wt % of the PP/CaCO$_3$ masterbatch for a 14 wt % CaCO$_3$ concentration and 15 wt % of the polypropylene homopolymer.

From Examples 17-30 and Comparative Example M it can be seen that without the low molecular weight polypropylene component the MVTR is very low. However, the MVTR is substantially increased in the Examples where as little as 3 wt % of the LMWPP is present. As the concentration of the LMWPP is increased in the composition, the breaking elongation of the resulting microporous film decreases. At a given concentration of LMWPP, using a higher melt viscosity LMWPP results in higher breaking elongation, and higher levels of CaCO$_3$ result in substantially higher MVTR values.

Compositions of the oriented film, film casting conditions of screw RPM and line speed in feet per minute (fpm), machine direction stretch ratio, film thickness as cast and after being stretched in the MD, transverse direction film speed and stretch ratio are tabulated for the oriented film of Examples 17-30 and Comparative Example M in Table XI.

The MVTR values obtained on these films after being biaxially stretched ranged from about 3,321 to 6,029 g/m²/24 hr. Elongation at break in the transverse and machine directions were obtained on these films. The basis weights, elongation at break and MVTR properties for these films are given in Table XII.

TABLE XI

| Composition and Film Forming Conditions | | | | | | | | | | | |
|---|---|---|---|---|---|---|---|---|---|---|---|
| | Composition Wt. % | | | | | Screw | Cast Line Speed, | MD Stretch | Film Thickness, mil stretched | | TD Line Speed, | TD Stetch |
| | P-1$^{(a)}$ | P-2$^{(b)}$ | P-3$^{(c)}$ | P-4$^{(d)}$ | P-5$^{(e)}$ | RPM | fpm | Ratio | Cast | Oriented MD | fpm | Ratio |
| Example | | | | | | | | | | | | |

TABLE XI-continued

| | Composition and Film Forming Conditions | | | | | | | | | | | |
|---|---|---|---|---|---|---|---|---|---|---|---|---|
| | Composition Wt. % | | | | | Screw | Cast Line Speed, | MD Stretch | Film Thickness, mil stretched | | TD Line Speed, | TD Stetch |
| | P-1[a] | P-2[b] | P-3[c] | P-4[d] | P-5[e] | RPM | fpm | Ratio | Cast | Oriented MD | fpm | Ratio |
| 17 | 50 | 33.0 | 3.0 | 14.0 | 2 ppm | 50 | 25.1 | 2:1 | 4.36 | 3.35 | 150 | 2.1:1 |
| 18 | 50 | 28.2 | 3.0 | 18.8 | 2 ppm | 50 | 25.4 | 2:1 | 4.58 | 3.89 | 150 | 2.1:1 |
| 19 | 60 | 22.2 | 3.0 | 14.8 | 2 ppm | 50 | 25.3 | 2:1 | 4.58 | 3.66 | 150 | 2.1:1 |
| 20 | 50 | 30.0 | 6.0 | 14.0 | 2 ppm | 48 | 25.4 | 2:1 | 4.58 | 3.68 | 150 | 2.1:1 |
| 21 | 50 | 30.0 | 6.0 | 14.0 | 2 ppm | 48 | 25.1 | 2:1 | 4.58 | 3.66 | 150 | 2.1:1 |
| 22 | 50 | 27.0 | 9.0 | 14.0 | 2 ppm | 48 | 25.2 | 2:1 | 4.58 | 3.16 | 120 | 2.1:1 |
| 23 | 50 | 30.0 | 6.0 | 14.0 | 2 ppm | 48 | 25.0 | 2:1 | 4.31 | 3.39 | 150 | 2.1:1 |
| 24 | 50 | 30.0 | 6.0 | 14.0 | 2 ppm | 48 | 25.5 | 2:1 | 4.31 | 3.26 | 150 | 2.1:1 |
| 25 | 50 | 27.0 | 9.0 | 14.0 | 2 ppm | 48 | 25.3 | 2:1 | 4.31 | 3.57 | 150 | 2.1:1 |
| 26 | 50 | 27.0 | 9.0 | 14.0 | 2 ppm | 48 | 25.3 | 2:1 | 4.31 | 3.73 | 150 | 2.1:1 |
| 27 | 50 | 21.0 | 15.0 | 14.0 | 2 ppm | 48 | 25.4 | 2:1 | 4.31 | 3.72 | 150 | 2.1:1 |
| 28 | 50 | 33.0 | 3.0 | 14.0 | 2 ppm | 48 | 25.2 | 2:1 | 4.32 | 3.23 | 80 | 2.2:1 |
| 29 | 50 | 33.0 | 3.0 | 14.0 | 2 ppm | 48 | 25.3 | 2:1 | 4.32 | 3.23 | 150 | 2.2:1 |
| 30[f] | 49.5 | 22.2 | 3.0 | 14.8 | 2 ppm | 48 | 25.2 | 2:1 | | | | |
| Comparative Example | | | | | | | | | | | | |
| M | 50 | 36 | — | 14.0 | 2 ppm | 48 | 25.1 | 2:1 | 4.32 | 3.07 | 150 | 2.2:1 |

[a]P-1 - Ethylene-propylene block coplymer
[b]P-2 - Polypropylene homopolymer
[c]P-3 - Low molecular weight polypropylene
[d]P-4 - Calcium Carbonate
[e]P-5 - Red quinacridone dye
[f]Contains 10.5 wt % mineral oil

TABLE XII

| | Physical Properties | | | |
|---|---|---|---|---|
| | Basis Weight, g/m² | Elongation, % | | MVTR, g/m²/24 hr |
| | | MD | TD | |
| Example | | | | |
| 17 | 23.4 | 115 | 90 | 3,653 |
| 18 | 29.5 | 76 | 61 | 5,679 |
| 19 | 29.5 | 86 | 64 | 4,862 |
| 20 | 25.1 | 115 | 84 | 4,630 |
| 21 | 27.8 | 102 | 77 | 5,024 |
| 22 | 24.8 | 123 | 70 | 4,567 |
| 23 | 24.8 | 122 | 60 | 3,612 |
| 24 | 22.4 | 116 | 81 | 3,321 |
| 25 | 31.2 | 71 | 58 | 4,863 |
| 26 | 27.8 | 48 | 34 | 5,903 |
| 27 | 20.7 | 42 | 35 | 6,029 |
| 28 | 23.7 | 108 | 70 | 5,213 |
| 29 | 21.4 | 101 | 73 | 4,846 |
| 30 | 25.8 | 68 | 55 | 4,664 |
| Comparative Example | | | | |
| M | 24.1 | 147 | 112 | 435 |

EXAMPLE 31

The oriented microporous film of Example 31 was prepared from a composition of 50 wt % ethylene-propylene block copolymer, Hifax RA-061, 35 wt % of PP/CaCO$_3$ masterbatch, PF-85F from A. Schulman containing 60 wt % of polypropylene having a MFR of 4.0 and 40 wt % of CaCO$_3$ having a mean particle size of 0.8 microns, and 15 wt % of low molecular weight polypropylene, Proflow-1000, having a melt viscosity of 137 poise measured at 136 sec$^{-1}$ and 190° C. The blend composition was melt compounded in a 19 mm Brabender extruder with a polymer melt temperature of 214° C. and an extruder screw speed of 100 rpm and was cast into a film with a 19 mm Brabender extruder using a 15.25 cm wide slit film die. The film extrusion process conditions included a polymer melt temperature of 240° C., an extruder screw speed of 70 rpm, and chill roll temperatures of 91° C. The film was stretched biaxially on a T.M. Long Stretcher at a 2:1 stretch ratio and two different temperatures. For the films of Example 31 containing 14 wt % CaCO$_3$, the MVTRs, measured using the desiccant cup, 20-hour ASTM E-96 test, were 5,570 g/m²/24 hr at a 60° C. stretch temperature, and 4,870 g/m²/24 hr at a 77° C. stretch temperature.

EXAMPLE 32

The oriented microporous film of Example 32 was prepared in the same manner and process conditions as Example 31 with the exception that a PP/CaCO$_3$ masterbatch, PF-92E from A. Schulman, containing 60 wt % of polypropylene having a MFR of 4.0 and 40 wt % of CaCO$_3$ having a mean particle size of 4.0 microns, was used. For the oriented film of Example 32 containing 14 wt % CaCO$_3$, the MVTRs, measured using the desiccant cup, 20-hour ASTM E-96 test, were 5,310 g/m²/24 hr at 60° C. and 5,130 g/m²/24 hr at 77° C.

The oriented microporous films of Example 31 prepared with CaCO$_3$ particles having a mean size of 0.8 microns produced films which appeared to have less of a tendency to tear during formation and orientation than the films of Example 32 prepared with CaCO$_3$ particles having a mean size of 4.0 microns. The microporous films made from the smaller size CaCO$_3$ particles had a higher MVTR when stretched at 60° C., but a lower MVTR when stretched at 77° C.

EXAMPLE 33

The oriented film of Example 33 was prepared from a composition of 70 wt % of ethylene-propylene copolymer Hifax RA-061, 20 wt % of polypropylene homopolymer 6200P of Amoco Chemical Co. and 10 wt % of Proflow resin having a melt viscosity of 137 poise measured at 136 sec$^{-1}$ and a temperature of 190° C. The composition was compounded and pelletized with a 63.5 mm Prodex extruder. The blend was cast into film from a 61 cm wide die having a die lip gap of 10 mils onto a heated chill roll with a surface temperature of 110° C. The cast film thickness was about 4.5 to 5 mils, and the extruder rpm was typically set at 48 to 50, which produces an output rate of about 25 kg/hr. The cast film line speed was 0.125 m/s and the MD orientation stretch ratio was 2.5:1. The film width at the MD inlet and outlet was 50.8 cm and 48.3 cm, respectively. The MD orientation was at a temperature of 60° C. and the annealing section was set at 71° C. with some of the MD oriented film edgetrimmed before windup. The TD orientation was at a draw ratio of 2:1 and draw temperature of 49°, 60°, 71°, 82°, 93° and 104° C. The film line speed in the TD orientation section was 0.75 m/s. The MVTR values measured on 2.54 cm diameter foil masked film samples using a 4-hour, desiccant cup version of ASTM E-96 are as follows:

| TD Orientation Temperature, °C. | MVTR, g/m$^2$/24 hr |
|---|---|
| 49 | 1,490 |
| 60 | 1,681 |
| 71 | 1,933 |
| 82 | 1,521 |
| 93 | 1,054 |
| 104 | 468 |

EXAMPLE 34

The oriented film of Example 34 was prepared from a composition of 70 wt % of ethylene-propylene copolymer Hifax RA-061, 20 wt % of PP/CaCO$_3$ masterbatch PF-85F from A. Schulman containing 60 wt % of a polypropylene having a MFR of 4.0 and 40 wt % of CaCO$_3$ having a mean particle size of 0.8 microns and 10 wt % of Proflow resin having a melt viscosity of 137 poise measured at 136 sec$^{-1}$ and a temperature of 190° C. with the same processing conditions as in Example 33 with the exception that the TD orientation was made at temperatures of 60°, 71°, 82° and 93° but not at the temperatures of 49° or 104° C. The MVTR values for MD oriented films containing 8 wt % CaCO$_3$ and oriented in the TD at four different temperatures and measured on 2.54-cm diameter foil-mask samples using a 4-hour, desiccant cup version of ASTM E-96 were as follows:

| TD Orientation Temperature, °C. | MVTR, g/m$^2$/24 hr |
|---|---|
| 60 | 6,625 |
| 71 | 6,885 |
| 82 | 6,135 |
| 93 | 6,115 |

EXAMPLE 35

The oriented film of Example 35 was prepared from a composition of 50 wt % of ethylene-propylene copolymer Hifax RA-061, 35 wt % of a PP/CaCO$_3$ masterbatch PF-85F from A. Schulman containing 60 wt % of polypropylene having a MFR of 4.0 and 40 wt % of CaCO$_3$ having a mean particle size of 0.8 microns and 15 wt % of Proflow resin having a melt viscosity of 137 poise measured at 136 sec$^{-1}$ and a temperature of 190° C. with the same processing conditions as in Example 33 with the exception that the TD orientation was not made at 49° C. but was made at 116° C. The MVTR values for MD oriented films containing 14 wt % CaCO$_3$ and oriented in the TD at six different temperatures and measured on 2.54-cm diameter foil-mask samples using a 4-hour, desiccant cup version of ASTM E-96 are as follows:

| TD Orientation Temperature, °C. | MVTR, g/m$^2$/24 hr |
|---|---|
| 60 | 7,309 |
| 71 | 6,956 |
| 82 | 8,027 |
| 93 | 8,598 |
| 104 | 9,020 |
| 116 | 7,832 |

Examples 33–35 illustrate the effect of the TD stretch temperature and of the CaCO$_3$ content on the MVTR of the film. The CaCO$_3$-containing film exhibited significantly higher MVTR values compared to the films containing no CaCO$_3$. The Examples also illustrate that increasing the TD orientation temperature up to as high as 116° C. does not lead to a decrease in the MVTR of the CaCO$_3$-containing film.

EXAMPLE 36

The oriented microporous film of Example 36 was prepared from a composition of 70 wt % of ethylene-propylene block copolymer, Hifax RA-061, 20 wt % of a PP/CaCO$_3$ masterbatch PF-85F from A. Schulman containing 60 wt % of a polypropylene having a MFR of 4.0 and 40 wt % of a calcium carbonate having a mean particle size of 0.8 microns, and 10 wt % of a low molecular weight polypropylene, Proflow-1000 having a melt viscosity of 137 poise measured at 136 sec$^{-1}$ and 190° C. The composition was melt compounded in a 19 mm Brabender extruder with a polymer melt temperature of 204° C. and an extruder screw speed of 100 rpm and was cast into a film with a 19 mm Brabender extruder using a 15.25 cm wide slit film die. The film extrusion process conditions included a polymer melt temperature of 240° C., an extruder screw speed of 70 rpm, and chill roll temperatures of 91° C. The film was stretched biaxially on a T.M. Long Stretcher at a 2:1 stretch ratio at three temperatures of 49°, 60° and 71° C. At 49° C., the film tore and no MVTR was measured. For the films of Example 36 containing 14 wt % CaCO$_3$, the MVTRs, measured using the desiccant cup, 20-hour ASTM E-96 test, were 3,435 g/m$^2$/24 hr at 60° C. and 1,505 g/m$^2$/24 hr at 71° C.

EXAMPLE 37

The oriented microporous film of Example 37 was prepared from a composition of 70 wt % of ethylene-propylene block copolymer, Hifax RA-061, 20 wt % of a PP/CaCO$_3$ masterbatch PF-85F from A. Schulman containing 60 wt % of a polypropylene having a MFR of 4.0 and 40 wt % of a calcium carbonate having a mean particle size of 0.8 microns, 5 wt % of a polypropylene homopolymer, 6200P from Amoco Chemical Co. and 5 wt % of a low molecular weight, Proflow-1000 having a melt viscosity of 137 poise measured at 136 sec$^{-1}$ and 190° C. The processing conditions were the same as for Example 35. The film was stretched biaxially on a T.M. Long Stretcher at a 2:1 stretch ratio and at two temperatures of 49° and 60° C. For these films containing 8 wt % CaCO$_3$, the MVTR, measured using the desiccant cup, 20-hour ASTM E-96 test, was 3,225 g/m$^2$/24 hr at 49° C. and 2,055 g/m$^2$/24 hr at 60° C.

COMPARATIVE EXAMPLE N

The oriented microporous film of Comparative Example N was prepared from a composition of 70 wt % of PA-30, an impact modifier from Exxon believed to contain polyisobutylene and polypropylene, 20 wt % of PP/CaCO$_3$ masterbatch PF-85F from A. Schulman containing 60 wt % of polypropylene having a MFR of 4.0 and 40 wt % of CaCO$_3$ having a mean particle size of 0.8 microns, and 10 wt % of low molecular weight polypropylene, Proflow-1000 having a melt viscosity of 137 poise measured at 136 sec$^{-1}$ and 190° C. The processing conditions were the same as for Example 35. The film was stretched biaxially on a T.M. Long Stretcher at a 2:1 stretch ratio and at two temperatures of 49° and 60° C. For these films containing 8 wt % CaCO$_3$, the MVTRs, measured using the desiccant cup, 20-hour ASTM E-96 test, were 52 g/m$^2$/24 hr at 49° C. and 193 g/m$^2$/24 hr at 60° C.

Examples 36 and 37 and Comparative Example N illustrate the effect of a lower content of the low molecular weight polyolefin material at the same CaCO$_3$ content and of the substitution of an impact modifier material for the ethylene-propylene block copolymer material on the MVTR of the film. The CaCO$_3$-containing films exhibited similar good MVTR values at both the 5 and 10 wt % level of the low molecular weight polyolefin. Comparative Example N illustrates that replacing the ethylene-propylene block copolymer with an impact modifier, believed to contain polyisobutylene and polypropylene, does not yield microporous films.

That which is claimed is:

1. A polymeric composition comprising,
   about 40 to about 90 parts by weight of a component A comprising an ethylene-propylene block copolymer having an ethylene content of about 10 to about 50 wt %,
   about 5 to about 40 parts by weight of a component B comprising a propylene homopolymer or random copolymer having up to about 10 wt % of a comonomer of ethylene or an α-olefin of 4 to 8 carbon atoms,
   about 1 to about 5 parts by weight, per 100 parts by weight of components A and B, of a component C comprising a low molecular weight polypropylene having a melt viscosity of about 50 to about 1,000 poise measured at a shear rate of 136 sec$^{-1}$ and 190° C.,
   about 5 to about 30 parts by weight, per 100 parts by weight of components A and B, of a component D comprising calcium carbonate, and
   about 0.1 to about 10 ppm, per 100 parts by weight of components A and B, of a component E comprising a beta-spherulite nucleating agent.

2. The polymeric composition of claim 1 wherein said beta-spherulite nucleating agent comprises a red quinacridone dye.

3. The polymeric composition of claim 2 wherein said red quinacridone dye has the structural formula:

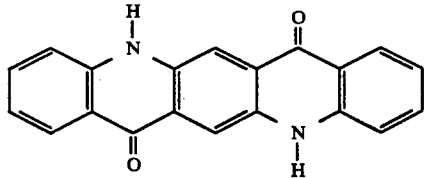

4. The polymeric composition of claim 3 wherein said low molecular weight polypropylene has a melt viscosity of about 70 to about 550 poise measured at a shear rate of 136 sec$^{-1}$ and 190° C.

5. The polymeric composition of claim 4 wherein said ethylene-propylene block copolymer has an ethylene content of about 30 to about 45 wt %.

6. A polymeric composition comprising,
   about 30 to about 95 parts by weight of a component A comprising an ethylene-propylene block copolymer having an ethylene content of about 10 to about 50 wt %,
   about 70 to about 5 parts by weight of a component B comprising a propylene homopolymer or random copolymer having up to about 10 wt % of a comonomer of ethylene or an α-olefin of 4 to 8 carbon atoms,
   about 1 to about 10 parts by weight, per 100 parts by weight of components A and B, of a component C comprising a low molecular weight polypropylene having a melt viscosity of about 50 to about 1,000 poise measured at a shear rate of 136 sec$^{-1}$ and 190° C.,
   about 5 to about 30 parts by weight, per 100 parts by weight of components A and B, of a component D comprising calcium carbonate, and
   about 0.1 to about 10 ppm, per 100 parts by weight of components A and B, of a component E comprising a beta-spherulite nucleating agent.

7. The polymeric composition of claim 1 or 6 wherein said component B consists of a propylene homopolymer.

* * * * *

UNITED STATES PATENT AND TRADEMARK OFFICE
CERTIFICATE OF CORRECTION

PATENT NO. : 5,317,035          Page 1 of 2
DATED      : May 31, 1994
INVENTOR(S): Philip Jacoby, et al It is certified that error appears in the above-indentified patent and that said Letters Patent is hereby corrected as shown below:

| Col. | Line | |
|---|---|---|
| | | in the Abstract, patent reads "4 to 8 carbon atoms, a low molecular weight polypropylene, a beta-spherulite nucleating agent and an inorganic filler. The microporous films" patent should read --4 to 8 carbon atoms, and components selected from a low molecular weight polypropylene, a beta-spherulite nucleating agent and an inorganic filler, and to processes for forming such films wherein the microporous films-- |
| 1 | 56 | "films for blends of polymer" should read --films from blends of polymer-- |
| 18 | 19 | "Steps (2) and (3) include hearing and stretching steps," should read --Steps (2) and (3) include heating and stretching steps,-- |

UNITED STATES PATENT AND TRADEMARK OFFICE
CERTIFICATE OF CORRECTION

PATENT NO. : 5,317,035
DATED : May 31, 1994
INVENTOR(S) : Philip Jacoby, et al

It is certified that error appears in the above-indentified patent and that said Letters Patent is hereby corrected as shown below:

| Col. | Line | |
|---|---|---|
| 42 | 19 | in Table XI-continued, in the line "30$^{(f)}$" patent reads<br>"49.5  22.2  3.0  14.8  2ppm  48  25.2  2:1"<br>patent should read<br>--49.5  22.2  3.0  14.8  2ppm  48  25.2  2:1<br>4.32  3.44  150  2.2:1-- |

Signed and Sealed this

Sixth Day of September, 1994

BRUCE LEHMAN

Commissioner of Patents and Trademarks